(12) United States Patent
Toizumi

(10) Patent No.: US 12,190,419 B2
(45) Date of Patent: Jan. 7, 2025

(54) CORRECTION OF ANSWER INFORMATION ON ORIGINAL IMAGE PORTION

(71) Applicant: NEC Corporation, Tokyo (JP)

(72) Inventor: Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/638,897

(22) PCT Filed: Jul. 1, 2021

(86) PCT No.: PCT/JP2021/025008
§ 371 (c)(1),
(2) Date: Feb. 28, 2022

(87) PCT Pub. No.: WO2023/276123
PCT Pub. Date: Jan. 5, 2023

(65) Prior Publication Data
US 2024/0037821 A1    Feb. 1, 2024

(51) Int. Cl.
| | |
|---|---|
| *G06T 15/50* | (2011.01) |
| *G06T 3/40* | (2024.01) |
| *G06T 3/60* | (2006.01) |
| *G06T 11/60* | (2006.01) |
| *G06T 13/40* | (2011.01) |
| *G06V 10/25* | (2022.01) |
| *G06V 10/60* | (2022.01) |

(52) U.S. Cl.
CPC ............... *G06T 11/60* (2013.01); *G06T 3/40* (2013.01); *G06T 3/60* (2013.01); *G06T 13/40* (2013.01); *G06T 15/506* (2013.01); *G06V 10/25* (2022.01); *G06V 10/60* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,687,001 B2 * | 4/2014 | Shim ...................... | G06T 15/50 345/426 |
| 11,321,865 B1 * | 5/2022 | Kim ......................... | G06F 7/57 |

(Continued)

FOREIGN PATENT DOCUMENTS

| | | |
|---|---|---|
| JP | 2005-222152 A | 8/2005 |
| JP | 2006-040232 A | 2/2006 |

(Continued)

OTHER PUBLICATIONS

International Search Report for PCT Application No. PCT/JP2021/025008, mailed on Sep. 28, 2021.

*Primary Examiner* — Joni Hsu

(57) ABSTRACT

A learning system (10) comprises: a generation unit (110) configured to synthesize with an original image including a living body, information on a reflection component of light not derived from the original image to generate a synthetic image; and a learning unit (130) configured to perform learning for an estimation model (121) based on information on a specific portion of the living body estimated from the synthetic image by the estimation model and correct answer information showing a correct answer of the information on the specific portion in the original image. According to this learning system, it is possible to learn the estimation model appropriately.

9 Claims, 27 Drawing Sheets

(56) References Cited

U.S. PATENT DOCUMENTS

| | | | |
|---|---|---|---|
| 2005/0226470 A1 | 10/2005 | Kondo et al. | |
| 2006/0280341 A1 | 12/2006 | Koshizen et al. | |
| 2009/0169101 A1 | 7/2009 | Mitarai et al. | |
| 2016/0119558 A1* | 4/2016 | Kaneko | H04N 23/56 |
| | | | 348/164 |
| 2019/0014288 A1 | 1/2019 | Nishi et al. | |
| 2020/0104590 A1 | 4/2020 | Osuga et al. | |
| 2022/0189108 A1* | 6/2022 | Shandilya | G06F 18/21 |
| 2023/0177680 A1* | 6/2023 | Adsul | G06T 7/0012 |
| | | | 348/222.1 |

FOREIGN PATENT DOCUMENTS

| | | |
|---|---|---|
| JP | 2007-524919 A | 8/2007 |
| JP | 2010-224775 A | 10/2010 |
| JP | 2011-164141 A | 8/2011 |
| JP | 2020-052770 A | 4/2020 |
| JP | 2020-089594 A | 6/2020 |
| WO | 2004/090814 A1 | 10/2004 |
| WO | 2017/141584 A1 | 8/2017 |

\* cited by examiner

Fig.8
Reflection Image
(with Eye Glasses)
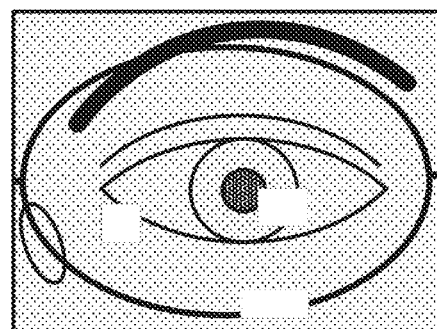
Original Image
(Iris Image)
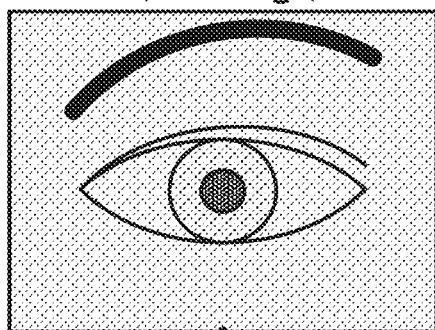
Reflection
Component
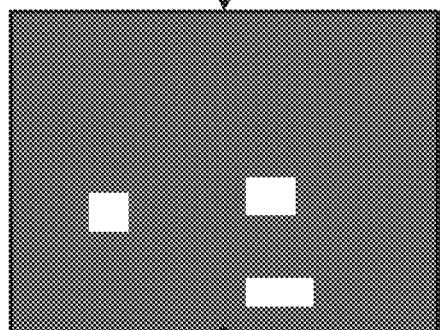
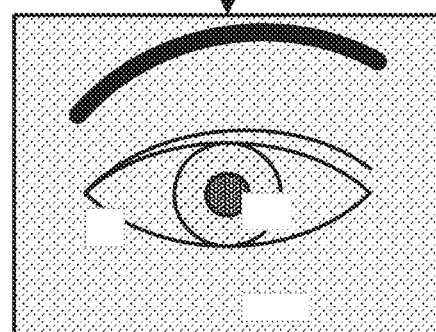
Synthetic Image Fig.15
Movement Process
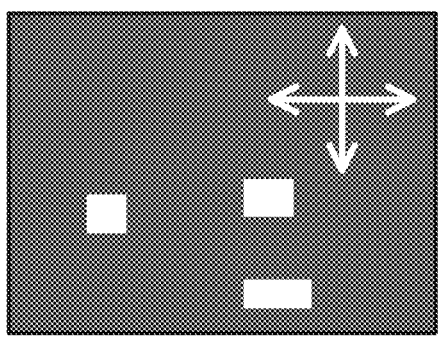
Rotation Process
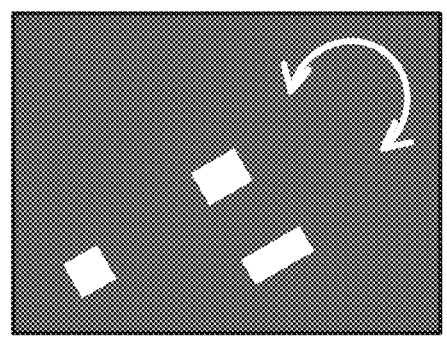
Enlargement Process
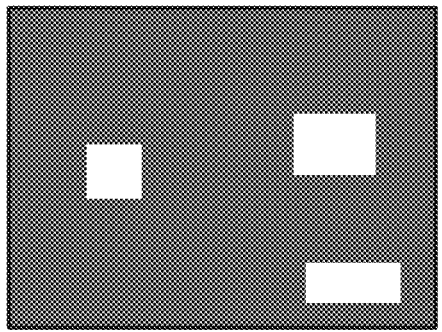
Reduction Process
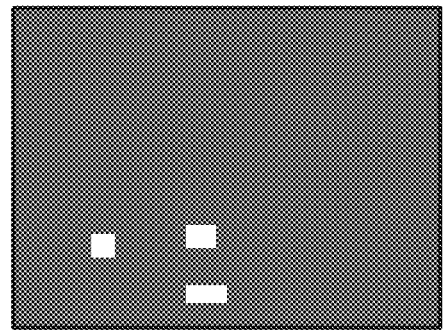

OK
(Reflection Component
and Iris are Overlapped
with each other)

NG
(Reflection Component and
Iris are NOT Overlapped
with each other)

CORRECTION OF ANSWER INFORMATION ON ORIGINAL IMAGE PORTION

This application is a National Stage Entry of PCT/JP2021/025008 filed on Jul. 1, 2021, the contents of all of which are incorporated herein by reference, in their entirety.

TECHNICAL FIELD

This disclosure relates to the technical fields of a learning system, an estimation system, a learning method, and a computer program, each performing learning of an estimation model.

BACKGROUND ART

As a system of this kind, there is known a system that perform processing related to a reflection component of light (i.e., an area in which reflected light is captured) in an image. For example, Patent Document 1 discloses a technique for combining specular and diffuse reflection components after separating and scaling the specular reflection components. Patent Document 2 discloses a technique for performing image transformation on only a diffuse reflection image after separating a specular reflection component, and then recombining it with a specular reflection image.

As other related technologies, for example, Patent Document 3 discloses a technology for updating parameters of a machine learning model based on a gradient vector calculated from a difference between estimated data and correct answer data. Patent Document 4 discloses a technique for learning a component recognition classifier used for face recognition by machine learning.

CITATION LIST

Patent Literature

Patent Literature 1: WO2017/141584
Patent Literature 2: WO2004/090814
Patent Literature 3: JP-A-2020-089594
Patent Literature 4: JP-A-2007-524919

SUMMARY

Technical Problem

This disclosure is made, for example, in view of each of the above cited references, and aims to provide a learning system, an estimation system, a learning method, and a computer program, each capable of appropriately learning an estimation model for a living body.

Solution to Problem

One aspect of a learning system of this disclosure comprises: a generation unit configured to synthesize with an original image including a living body, information on a reflection component of light not derived from the original image to generate a synthetic image; and a learning unit configured to perform learning for an estimation model based on information on a specific portion of the living body estimated from the synthetic image by the estimation model and correct answer information indicating a correct answer of the information on the specific portion in the original image.

One aspect of an estimation system of this disclosure comprises an estimation model and an output unit, wherein the estimation model is configured to be learned using: a generation unit configured to synthesize with an original image including a living body, information on a reflection component of light not derived from the original image to generate a synthetic image; and a learning unit configured to perform learning for the estimation model based on information on a specific portion of the living body estimated from the synthetic image by the estimation model and correct answer information indicating a correct answer of the information on the specific portion in the original image, and the output unit is configured to estimate and output information on the specific portion in an input image using the estimation model.

One aspect of a learning method of this disclosure comprises: synthesizing with an original image including a living body, information on a reflection component of light not derived from the original image to generate a synthetic image; and performing learning for an estimation model based on information on a specific portion of the living body estimated from the synthetic image by the estimation model and correct answer information indicating a correct answer of the information on the specific portion in the original image.

One aspect of a computer program of this disclosure allows a computer to: synthesize with an original image including a living body, information on a reflection component of light not derived from the original image to generate a synthetic image; and perform learning for an estimation model based on information on a specific portion of the living body estimated from the synthetic image by the estimation model and correct answer information indicating a correct answer of the information on the specific portion in the original image.

BRIEF DESCRIPTION OF DRAWINGS

FIG. 8 is a conceptual diagram showing an example of the synthesis process of the original image and the reflection component extracted from the reflection image.

FIG. 15 is a conceptual diagram showing an example of the perturbation process for the reflection component.

DESCRIPTION OF EXAMPLE EMBODIMENTS

The following describes the example embodiments of the learning system, the estimation system, the learning method, and the computer program with reference to the drawings.

First Example Embodiment

The learning system according to a first example embodiment will be explained with reference to FIGS. 1 through 4.
(Hardware Configuration)

Figure 1:
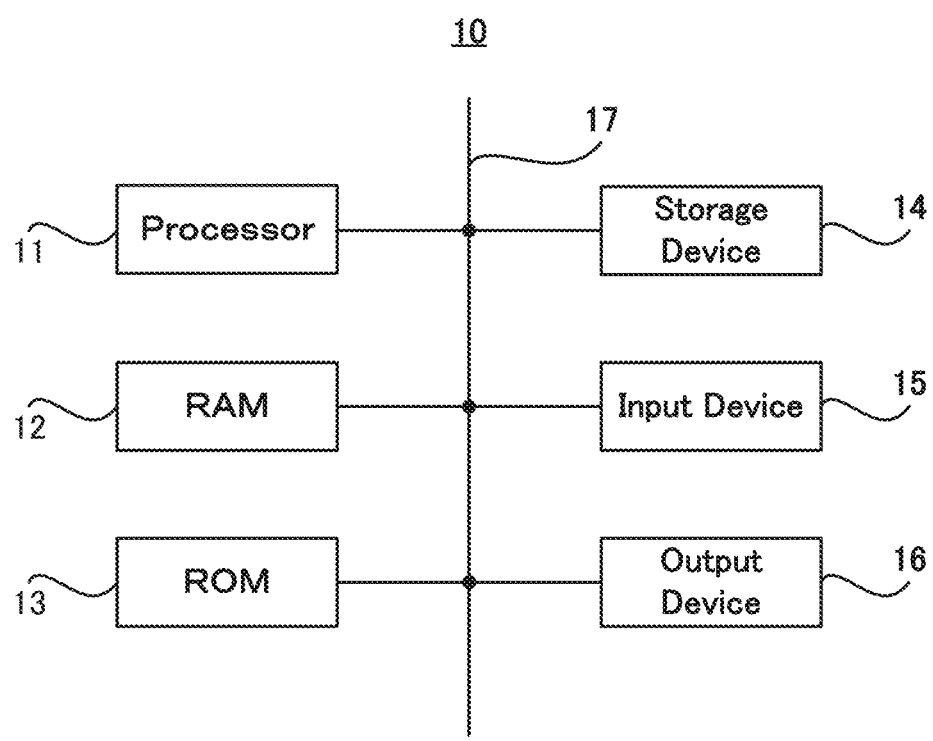
FIG. 1 is a block diagram showing a hardware configuration of the learning system according to the first example embodiment.

First, referring to FIG. 1, the hardware configuration of the learning system 10 according to the first example embodiment will be described. FIG. 1 is a block diagram of the hardware configuration of the learning system according to the first example embodiment.

As shown in FIG. 1, the learning system 10 according to the first example embodiment comprises a processor 11, a RAM (Random Access Memory) 12, a ROM (Read Only Memory) 13, and a storage device 14. The learning system 10 may further comprises an input device 15 and an output device 16. The processor 11, the RAM 12, the ROM 13, the storage device 14, the input device 15, and the output device 16 are connected via a data bus 17.

The processor 11 reads a computer program. For example, the processor 11 is configured to read the computer program stored in at least one of the RAM 12, the ROM 13, and the storage device 14. Alternatively, the processor 11 may read the computer program stored in a computer-readable recording medium, using a recording medium reading device not illustrated. The processor 11 may acquire (i.e., read) the computer program from an unillustrated device located outside the learning system 10 via a network interface. The processor 11 executes the read computer program to control the RAM 12, the storage device 14, the input device 15, and the output device 16. In the present embodiment, in particular, when the processor 11 executes the read computer program, functional blocks for executing processing related to machine learning are realized in the processor 11. Further, one of a CPU (Central Processing Unit), a GPU (Graphics Processing Unit), an FPGA (field-programmable gate array), a DSP (Demand-Side Platform), and an ASIC (Application Specific Integrated Circuit) may be employed as the processor 11, or more than one of them may be employed in parallel.

The RAM 12 temporarily stores the computer program to be executed by the processor 11. The RAM 12 temporarily stores data which is temporarily used by the processor 11 when the processor 11 is executing the computer program. D-RAM (Dynamic RAM) may be employed as the RAM 12, for example.

The ROM 13 stores the computer program to be executed by the processor 11. The ROM 13 may also store other fixed data. P-ROM (Programmable ROM) may be employed as the ROM 13, for example.

The storage device 14 stores data that the learning system 10 stores for a long term. The storage device 14 may act as a temporary storage device for the processor 11. The storage device 14 may include, for example, at least one of a hard disk drive, an optical magnetic disk drive, an SSD (Solid State Drive), and a disk array device.

The input device 15 is a device that receives input instructions from users of the learning system 10. The input device 15 may include, for example, at least one of a keyboard, a mouse, and a touch panel.

The output device 16 is a device that outputs information on the learning system 10 to the outside. For example, the output device 16 may be a display device (e.g., a display) that can show the information on the learning system 10.
(Functional Configuration)

Figure 2:
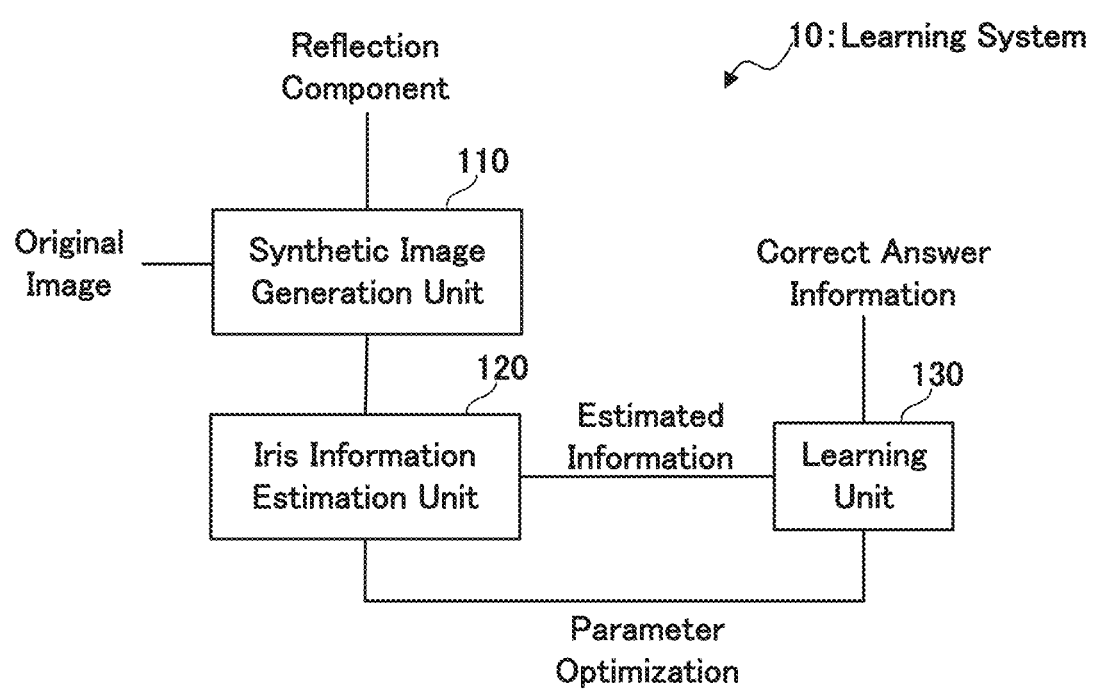
FIG. 2 is a block diagram showing a functional structure of the learning system according to the first example embodiment.

Next, with reference to FIG. 2, a functional configuration of the learning system 10 according to the first example embodiment will be described. FIG. 2 is a block diagram showing the functional configuration of the learning system according to the first example embodiment.

As shown in FIG. 2, the learning system 10 according to the first example embodiment comprises a synthetic image generation unit 110, an iris information estimation unit 120, and a learning unit 130 as processing blocks for realizing functions of the learning system 10. The synthetic image generation unit 110, the iris information estimation unit 120, and the learning unit 130 may be each realized in the processor 11 (see FIG. 1) described above, for example.

The synthetic image generation unit 110 is configured to generate a synthetic image by synthesizing with an original image including a living body, information on the reflection component of light that is not derived from the original image. The "original image" here is an image previous to the synthesis of the reflection component. The "information on the reflection component" is information related to components generated by the reflection of light, such as natural light, illumination light of the like, the light reflecting off an object with high reflectance, such as a mirror, a glass, an eyeglass or the like. The "information on the reflection component" can be information on the reflection component itself, or it can be information for simulating the reflection component. In the following, the "information on the reflection component" is referred to as "the reflection component" as appropriate. The synthetic image generation unit 110 acquires the original image and the reflection component, respectively, and performs the process of synthesizing the reflection component with the original image. Thus, the synthetic image becomes an image in which the reflection component exists in at least one area of the original image. The synthesis process may be a simple superimposition process or a more complex synthesis process. Since existing technologies can be employed as the synthesis process, detailed explanations are omitted here. The synthetic image generated by the synthetic image generation unit 110 is output to the iris information estimation unit 120.

The iris information estimation unit 120 is configured to estimate information on a specific portion of the living body based on the synthetic image (i.e., the image in which the reflection component is synthesized) generated by the synthetic image generation unit 110. The specific portion of the living body may be, for example, a part used for biometric authentication. Although the specific portion of the living body is not particularly limited, in the present example embodiment, it is assumed that information on an iris as an example is estimated, and in the following explanation, it is assumed that the specific portion of the living body is the iris. The information on the specific portion of the living body, for example, may be information indicating the position of the specific portion (such as coordinate information), or may be information indicating the feature quantity of the specific portion. The iris information estimation unit 120 may estimate only one type of information on the specific portion of the living body, or may estimate more than one type of information. Since existing techniques for estimating the information on the specific portion of the living body from an image can be adopted as appropriate, detailed explanations are omitted here. The information on the specific portion of the living body estimated by the iris information estimation unit 120 is output to the learning unit 130.

The learning unit 130 is configured to perform learning for the iris information estimation unit 120 based on the information on the specific portion of the living body estimated by the iris information estimation unit 120 and the correct answer information that indicates a correct answer of the information on the specific portion in the original image. Specifically, the learning unit 130 optimizes parameters so that the iris information estimation unit 120 is capable of estimating the information on the iris with higher accuracy based on the information on the iris estimated by the iris information estimation unit 120 and the correct answer information on the iris in the original image. The "correct answer information" here is information on the specific portion actually included in the original image, and is predetermined as information that the iris information estimation unit 120 should estimate from the synthetic image. Examples of the correct answer information include: a center position of an iris, a radius of an iris circle, feature points on an iris circle, a center position of a pupil, a radius of a pupil, feature points on a pupil circle, feature points on an eyelid, opened or closed eye, a length of eyelashes, a number of eyelashes, a density of eyelashes, false eyelashes or no false eyelashes, double eyelid or no double eyelid, made-up or no made-up, eye glass or no eye glass, a contact lens or no contact lens, abnormality of the eye or no abnormality of the eye, information indicating a living body or no living body, color of an iris, a pattern type of an iris, information specifying an individual, and the like. The correct answer information is input as training data where the correct answer information is paired with the original image. The correct answer information may be created by human work or may be information estimated from the original image by a method different from the iris information estimation unit 120. The learning unit 130 typically performs the learning for the iris information estimation unit 120 using a plurality of synthetic images and their correct answer information. As for the specific method of the learning by the learning unit existing techniques can be adopted as appropriate, and detailed explanations here are omitted.

(Synthesis of Reflection Component)

Figure 3:
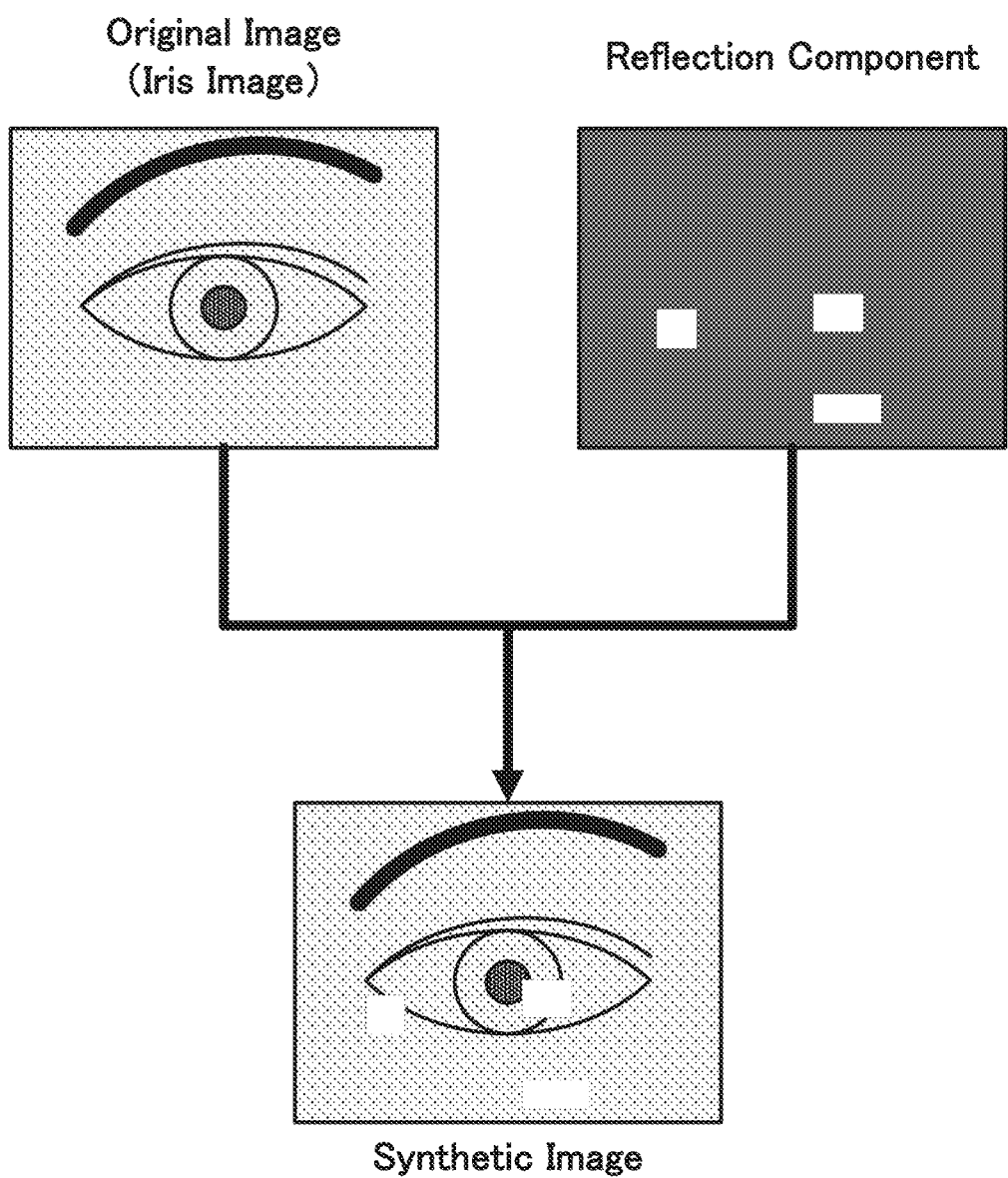
FIG. 3 is a conceptual diagram showing an example of the synthesis process of the original image and the reflection component.

Next, with reference to FIG. 3, the synthesis of the reflection component by the above-mentioned synthetic image generation unit 110 will be explained in detail. FIG. 3 is a conceptual diagram showing an example of the synthesis process with respect to the original image and the reflection component.

The original image (iris image) and the reflection component, as shown in FIG. 3, are input to the synthetic image generation unit 110. The reflection component here can be assumed to be the reflection component in a case, for example, that the living body is assumed to wear eye glasses and light is reflected by the eye glasses. The reflection component may be a component with a relatively high pixel value, as illustrated (here, an image having three rectangular areas coloring close to white is input as the reflection component. (Here, an image which has three rectangular areas coloring close to white is input as the reflection component. The shape of the area of the reflection component is not limited to a rectangular, and the area can each have any shape.)

The synthetic image generation unit 110 generates a synthetic image by synthesizing the original image and the reflection component, which have been input. The synthetic image may be an image in which the reflection component (i.e., the white rectangular areas) is overlapped on the original image, as shown in FIG. 3. Here, one synthetic image is generated from one original image, but more than one synthetic image may be generated from one original image. In such a case, different reflection components may be synthesized with one original image, or the same reflection component may be synthesized in different ways. The configuration of synthesizing the same reflection component in different ways will be explained in detail in other example embodiments described below.

(Operation Flow)

Figure 4:
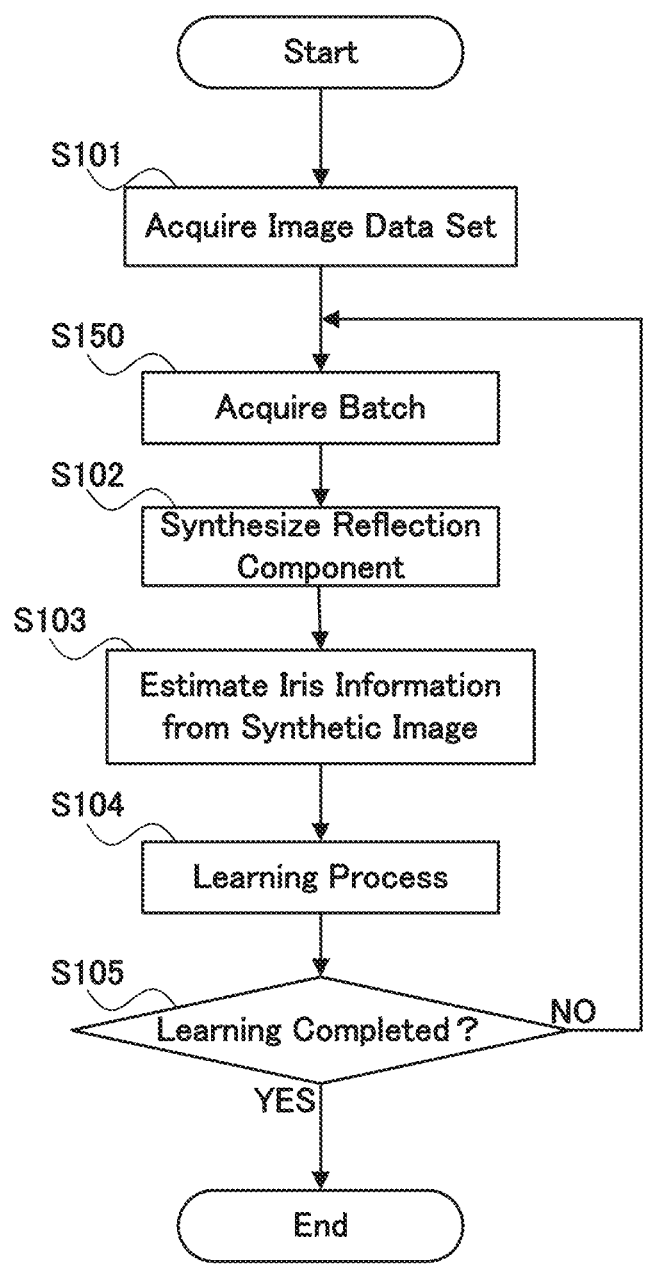
FIG. 4 is a flowchart showing a flow of operations of the learning system according to the first example embodiment.

Next, a flow of operations of the learning system 10 according to the first example embodiment will be described with reference to FIG. 4. FIG. 4 is a flowchart showing the flow of operation of the learning system according to the first example embodiment.

As shown in FIG. 4, when the learning system 10 of the first example embodiment operates, first, the synthetic image generation unit 110 acquires a set of original images as an image data set (step S101). The synthetic image generation unit 110 may acquire the image data set stored in, for example, a storage or the like. After acquiring the image data set, the synthetic image generation unit 110 enters a learning loop. Within the learning loop, first, the synthetic image generation unit 110 randomly acquires the training data each piece thereof consisting of a pair of the correct answer and the original image from the acquired image data set, the number of pieces of the training data according with a predetermined batch size (Step S150).

Subsequently, the synthetic image generation unit 110 synthesizes the reflection component with the original image contained in the acquired batch (Step S102). The synthetic image generation unit 110 outputs the generated synthetic image to the iris information estimation unit 120. The synthetic image generation unit 110 may generate a plurality of synthetic images and output the plurality of synthetic images collectively to the iris information estimation unit 120.

Subsequently, the iris information estimation unit 120 estimates the information on the iris based on the synthetic image generated by the synthetic image generation unit 110 (Step S103). And then, the learning unit 130 performs the learning process for the iris information estimation unit 120, based on the information on the iris estimated by the iris information estimation unit 120 (hereinafter referred to as "estimated information" as appropriate) and the correct answer information in the original image, (Step S104).

Subsequently, the learning unit 130 determines whether or not all learning has been completed (step S105). The learning unit 130 may, for example, determine that the learning has been completed when a predetermined number of iterations has been achieved. Alternatively, the learning unit 130 may determine that the learning has been completed when a predetermined estimation accuracy has been achieved or when a change in the loss calculated based on the estimated information and the correct answer information has become constant.

When it is determined that the learning has been completed (Step S105: YES), the sequence of processes ends. On the other hand, when it is determined that the learning has not yet been completed (Step S105: NO), the processing may be started again from Step S150 (i.e., the step where the batch size of training data is acquired). At the second or subsequent round of Step S102, the synthetic image may be generated by synthesizing the reflection component with a different original image. Also, a different synthetic image may be generated for each loop, in such a way that the reflection component is synthesized with the same original image in a different way, or the like.

(Technical Effects)

Next, the technical effects obtained by the learning system 10 according to the first example embodiment will be described.

As described in FIGS. 1 through 4, in the learning system 10 according to the first example embodiment, the learning for the iris information estimation unit 120 is performed using the synthetic images in each of which the reflection component is synthesized with the original image. When the iris information estimation unit 120 is learned in this way, it is possible to accurately estimate the information on the specific portion of a living body even when the image containing the living body having the reflection component (for example, when the reflection component overlaps the specific portion of the living body). In addition, if more than one synthetic image is generated from a single original image, the image used for the learning can be expanded. Therefore, it is possible to learn a model more robust to the reflection component.

<Variation>

The learning system 10 according to a variation of the first example embodiment will be described with reference to FIGS. 5 and 6. The variation described below differs only in some configurations and operations in comparison with the first example embodiment, and the other parts may be the same as in the first example embodiment (see FIGS. 1 through 4). For this reason, in the following, the parts that differ from the first example embodiment already described will be explained in detail, and descriptions of the other parts, overlapping parts, will be omitted as appropriate.

(Configuration of Variation)

First, a functional configuration of the learning system 10 according to the variation of the first example embodiment will be explained with reference to FIG. 5. FIG. 5 is a block diagram showing the functional configuration of the learning system according to the variation of the first example embodiment. In FIG. 5, the reference signs same as in FIG. 2 are assigned to the elements similar to in FIG. 2 respectively.

Figure 5:
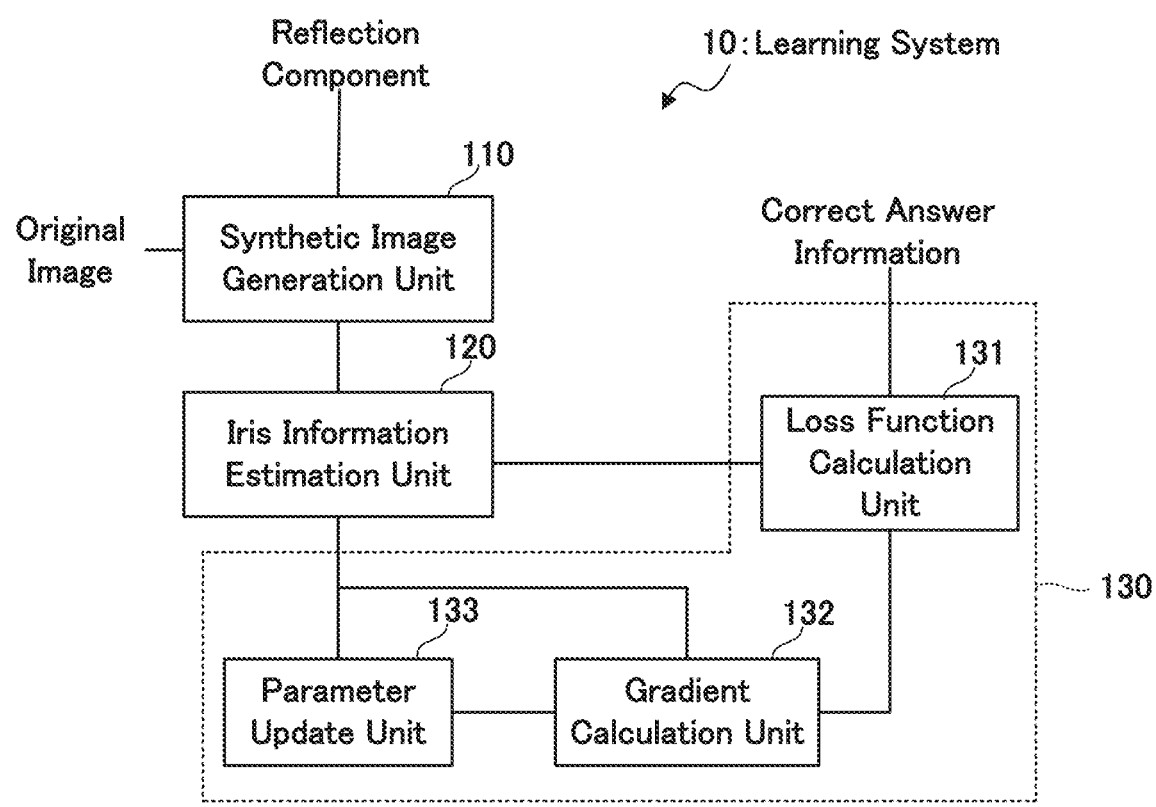
FIG. 5 is a block diagram showing a functional configuration of the learning system according to a variation of the first example embodiment.

As shown in FIG. 5, the learning system 10 according to the variation of the first example embodiment comprises a synthetic image generation unit 110, an iris information estimation unit 120, and a learning unit 130 as processing blocks for realizing functions of the learning system 10. In particular, in the learning system 10 according to the variation, the learning unit 130 comprises a loss function calculation unit 131, a gradient calculation unit 132, and a parameter update unit 133.

The loss function calculation unit 131 is configured to calculate a loss function based on the error between the estimated information estimated by the iris information estimation unit 120 and the correct answer information in the original image. As for the specific calculation method of the loss function, the existing technology can be adopted as appropriate, and the detailed explanations here are omitted here.

The gradient calculation unit 132 is configured to calculate a gradient using the loss function calculated by the loss function calculation unit 131. As for the specific calculation method of the gradient, the existing technology can be adopted as appropriate, and the detailed explanations here are omitted.

The parameter update unit 133 is configured to update parameters in the iris information estimation unit 120 (i.e., parameters for estimating iris information) based on the gradient calculated by the gradient calculation unit 132. The parameter update unit 133 optimizes the parameters so that the estimated information is estimated as information closer to the correct answer information by updating the parameters so that the loss calculated by the loss function becomes smaller.

(Operations of Variation)

Next, a flow of operations of the learning system 10 according to the variation of the first example embodiment will be explained with reference to FIG. 6. FIG. 6 is a flowchart showing the flow of operations of the learning system according to the variation of the first example embodiment. In FIG. 6, the reference signs same as in FIG. 4 are assigned to the processes similar to in FIG. 4 respectively.

Figure 6:
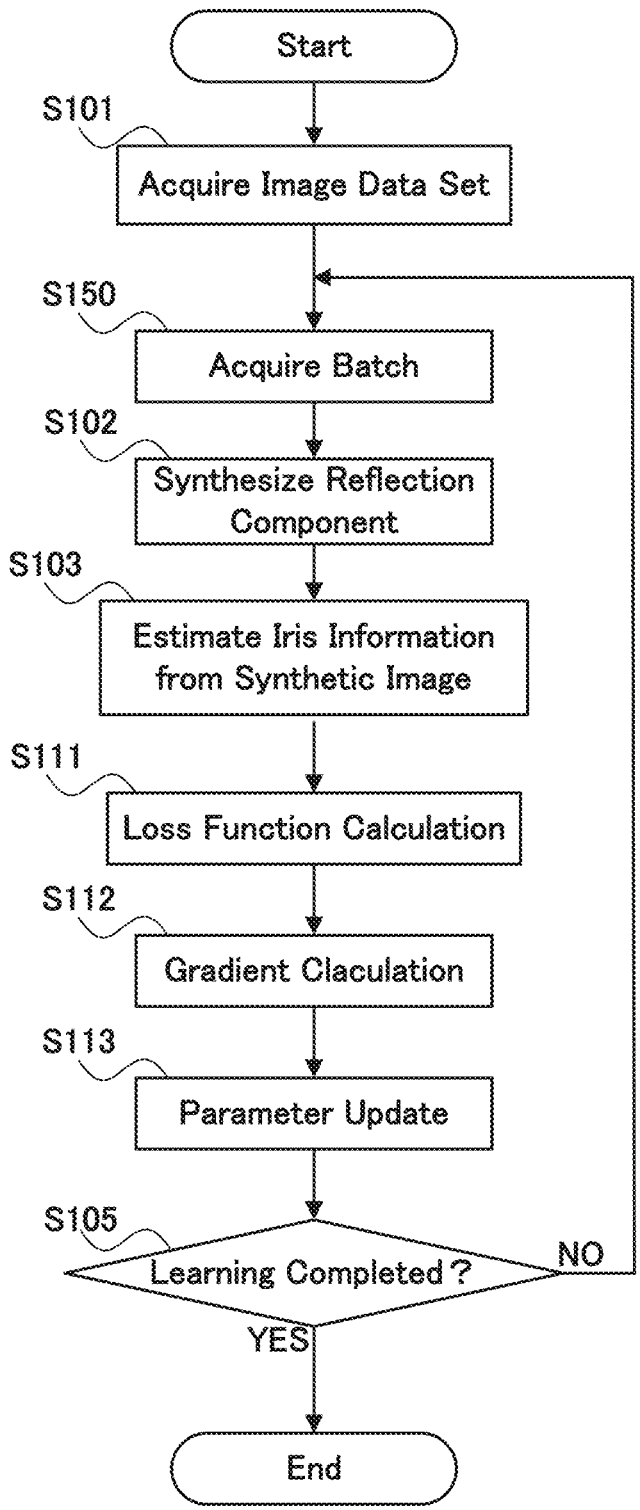
FIG. 6 is a flowchart showing a flow of operations of the learning system according to a variation of the first example embodiment.

As shown in FIG. 6, when the learning system 10 according to the variation of the first example embodiment operates, first, the synthetic image generation unit 110 acquires an image data set consisting of the original images (Step S101). Then, the synthetic image generation unit 110 acquires the training data each piece thereof consisting of a pair of the correct answer and the original image from the acquired image data set, the number of pieces of the training data according with a predetermined batch size, (Step S150). Then, the synthetic image generation unit 110 synthesizes the reflection component with the original image acquired (Step S102).

Subsequently, the iris information estimation unit 120 estimates the information on the iris based on the synthetic image generated by the synthetic image generation unit 110 (Step S103). The estimated information estimated by the iris information estimation unit 120 is output to the loss function calculation unit 131 in the learning unit 130.

Subsequently, the loss function calculation unit 131 calculates the loss function based on the estimated information input from the iris information estimation unit 120 and the correct answer information acquired as the training data. Then, the gradient calculation unit 132 calculates the gradient using the loss function (Step S111). Then, the gradient calculation unit 132 calculates the gradient using the loss function (Step S112). After that, the parameter update unit 133 updates the parameters of the iris information estimation unit 120 based on the calculated gradient (Step S113).

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S150 (i.e., the part where the batch size of training data is acquired).

(Effects of Variation)

Next, the technical effects obtained by the learning system 10 according to the variation of the first example embodiment will be described.

As described in FIGS. 5 and 6, in the learning system 10 according to the variation of the first example embodiment, the parameters in the iris information estimation unit 120 are optimized based on the gradient calculated using the loss function. Even when the iris information estimation unit 120 is learned in this way, similarly to the learning system 10 according to the first example embodiment described above, it is also possible to accurately estimate the information on the specific portion of a living body even when the image including the living body has the reflection component. In addition, more than one synthetic image can be generated from a single original image, and the image used for the learning can be expanded. Therefore, it is possible to learn a model more robust to the reflection component.

Second Example Embodiment

The learning system 10 according to a second example embodiment will be described with reference to FIGS. 7 through 9. The second example embodiment differs only in some configurations and operations from the first example embodiment described above, and the other parts may be the same as in the first example embodiment (see FIGS. 1 and 2). For this reason, in the following, the parts that overlap with the first example embodiment already described will be omitted as appropriate.

(Functional Configuration)

Next, with reference to FIG. 7, a functional configuration of the learning system 10 according to the second example embodiment will be described. FIG. 7 is a block diagram showing the functional configuration of the learning system according to the second example embodiment. In FIG. 7, the reference signs same as in FIG. 2 are assigned to the elements similar to in FIG. 2 respectively.

Figure 7:
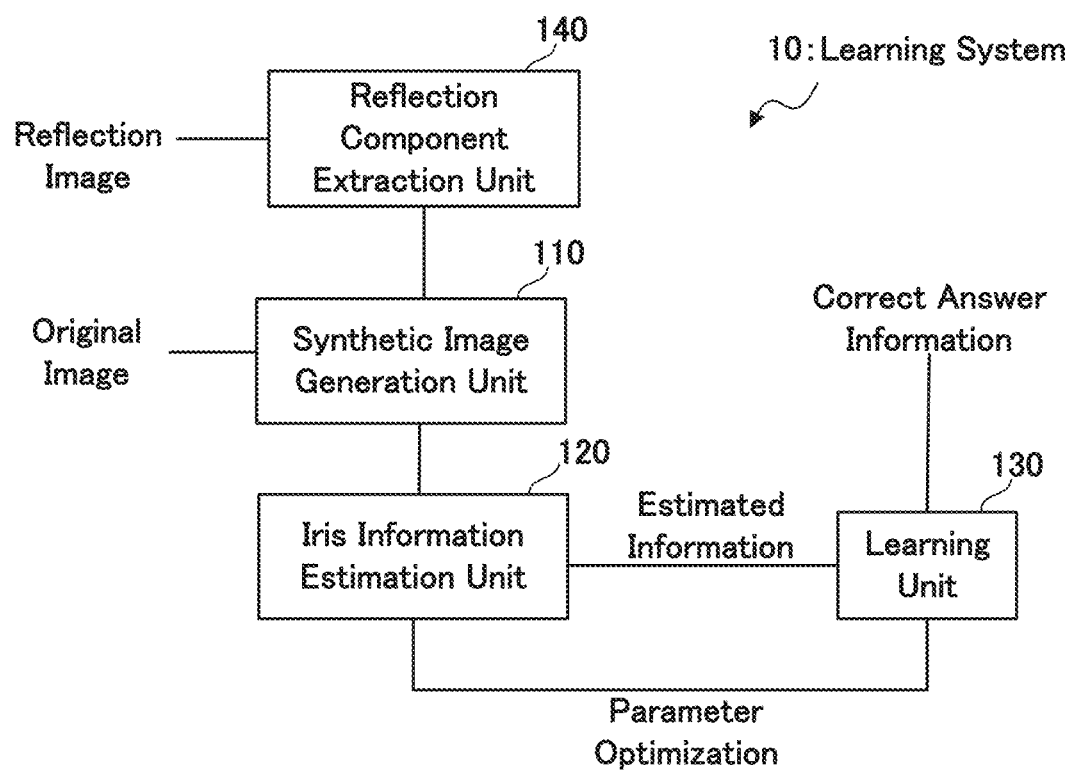
FIG. 7 is a block diagram showing a functional structure of the learning system according to the second example embodiment.

As shown in FIG. 7, the learning system 10 according to the second example embodiment comprises, as processing blocks for realizing functions of the learning system 10, a synthetic image generation unit 110, an iris information estimation unit 120, a learning unit 130, and a reflection component extraction unit 140. That is, the learning system 10 of the second example embodiment is configured with the reflection component extraction unit 140 in addition to the configuration of the first example embodiment (see FIG. 2). The reflection component extraction unit 140 may be realized, for example, in the processor 11 (see FIG. 1) described above.

The reflection component extraction unit 140 is configured to extract the reflective component from an image containing the reflection component (hereinafter referred to as the "reflection image" as appropriate). The reflection image here contains at least the reflection component regardless of its size, and the imaged target can be any object. For example, the reflection image may be an image where the living body (i.e., the same person) same as in the original image has been imaged, or may be an image where the other living body has been imaged. Or, the reflection image may be an image including no living body. The specific extraction method of the reflection component by the reflection component extraction unit 140 will be described in detail in the other example embodiments described later. The reflection component extracted by the reflection component extraction unit 140 is output to the synthetic image generation unit 110.

(Synthesis of Reflection Component)

Next, with reference to FIG. 8, the extraction of the reflection component by the above-mentioned reflection component extraction unit 140 will be described in detail. FIG. 8 is a conceptual diagram showing an example of the synthesis process of the original image and the reflection component extracted from the reflection image.

As shown in FIG. 8, the reflection component extraction unit 140 extracts only the reflection component from the reflection image containing the reflection component. The reflection image may be, for example, an image where a person wearing eye glasses has been imaged, as illustrated. Such a reflection image contains the reflection component caused by the light reflected by the eye glasses. Alternatively, the reflection image may be an image where only the eye glasses has been imaged (i.e., an image including no person). In this case, the reflection image also contains the reflection component caused by the light reflected by the eye glasses. The reflection image may not include an object that directly reflects light, such as eye glasses. For example, such an image may be also adopted: an image including a light source of illumination or the like instead of a reflective object; and an image including light reflected in a lens, the light emitted from a light source outside the field of view.

(Operation Flow)

Next, a flow of operations of the learning system 10 according to the second example embodiment will be described with reference to FIG. 9. FIG. 9 is a flowchart showing the flow of operations of the learning system according to the second example embodiment. In FIG. 9, the reference signs same as in FIG. 4 are assigned to the processes similar to in FIG. 4 respectively.

Figure 9:
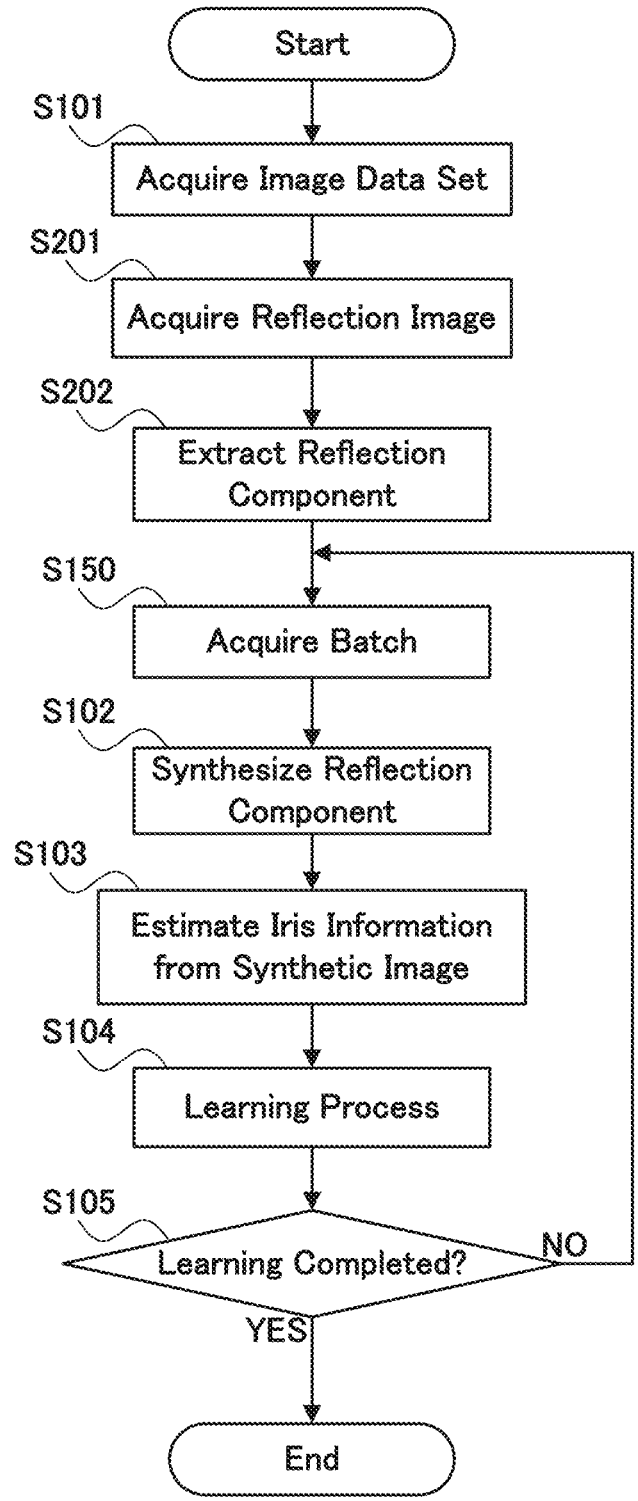
FIG. 9 is a flowchart showing a flow of operations of the learning system according to the second example embodiment.

As shown in FIG. 9, when the learning system 10 according to the second example embodiment operates, the synthetic image generation unit 110 acquires the image data set of the original images (Step S101).

Subsequently, the reflection component extraction unit 140 acquires a reflection image data set (Step S201). The reflective component extraction unit 140 may acquire an image data set containing the reflection component stored in, for example, the storage.

Subsequently, the reflection component extraction unit 140 extracts the reflection component from each reflection image of the acquired reflection image data set (Step S202). The reflection component extraction unit 140 outputs the extracted reflection components to the synthetic image generation unit 110. The above-described processes of step S201 and step S202 may be performed in parallel with or prior to the process of step S101 (i.e., the process in which the synthetic image generation unit 110 acquires the image data set of original images).

Subsequently, the synthetic image generation unit 110 acquires the training data each piece thereof consisting of a pair of the correct answer and the original image from the acquired image data set, the number of pieces of the training data according with a predetermined batch size (Step S150). Then, the synthetic image generation unit 110 synthesizes the reflection component extracted by the reflection component extraction unit 140 with the acquired original image (Step S102). The synthetic image generation unit 110 outputs the generated synthetic image to the iris information estimation unit 120.

Subsequently, the iris information estimation unit 120 estimates the information on the iris based on the synthetic image generated by the synthetic image generation unit 110 (Step S103). Then, the learning unit 130 performs the learning process for the iris information estimation unit 120 based on the estimated information estimated by the iris information estimation unit 120 and the correct answer information in the original image (Step S104).

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S150. When two or more types of reflection components are extracted in step S202 (i.e., two or more reflection components are extracted), At the second or subsequent round of Step S102, a different type of reflection component may be synthesized to generate the synthetic image.

(Technical Effects)

Next, the technical effects obtained by the learning system 10 according to the second example embodiment will be described.

As described in FIGS. 7 through 9, in the learning system 10 according to the second example embodiment, the reflection component is extracted from the reflection image, and the synthetic image is generated by synthesizing the reflection component extracted. In this way, the reflection component to be used for synthesis with the original image can be obtained through a predetermined extraction process. In addition, since the reflection component that occurs when an image is actually taken is extracted, the extracted reflection component can be used to expand data for the learning. Thereby, it is possible to learn a model that is more robust to changes in the environment.

Variation of the Second Example Embodiment

The learning system 10 for a variation of the second example embodiment will be described with reference to FIG. 10. The variation described below differs only in some operations compared to the second example embodiment, and the other parts may be the same as in the second example embodiment. For this reason, in the following, the parts that differ from the second example embodiment already described will be explained in detail, and descriptions of other overlapping parts will be omitted as appropriate.

(Operations of Variation)

First, a flow of operations of the learning system 10 according to the variation of the second example embodiment will be explained with reference to FIG. 10. FIG. 10 is a flowchart showing the flow of operations of the learning system according to the variation of the second example embodiment. In FIG. 10, the reference signs same as in FIG. 9 are assigned to the processes similar to in FIG. 9 respectively.

Figure 10:
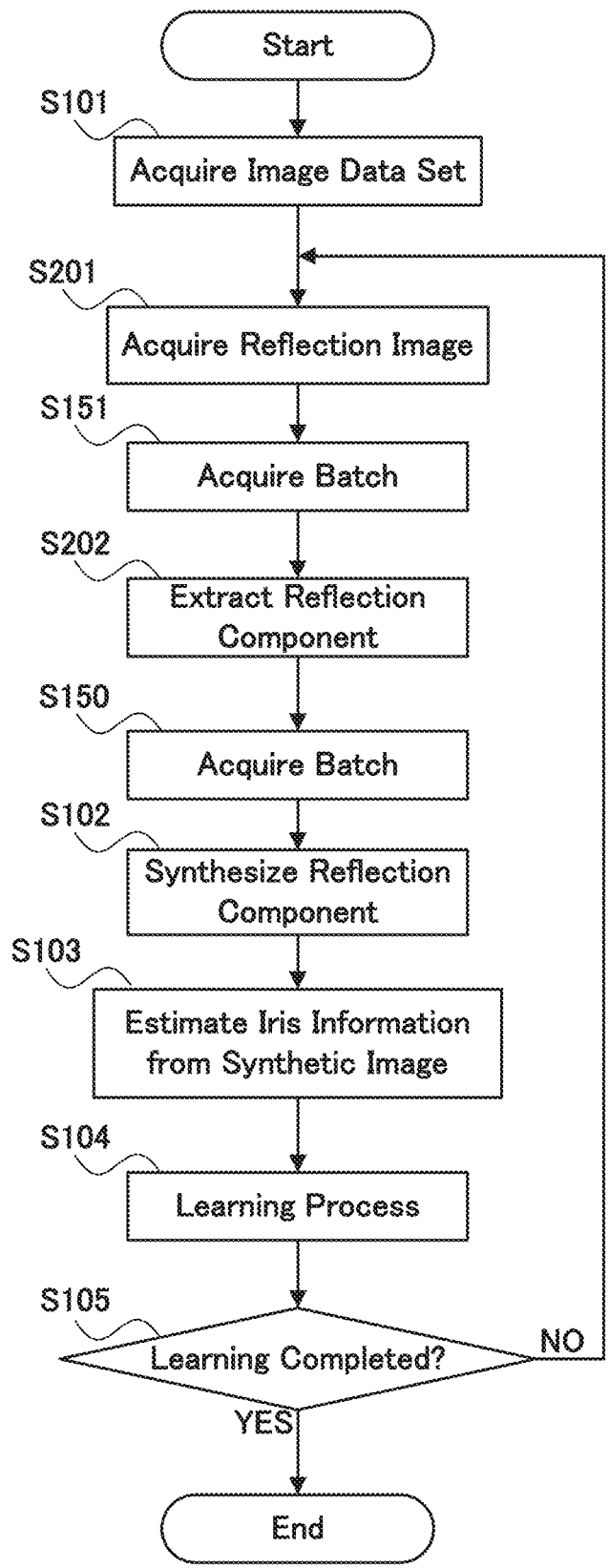
FIG. 10 is a flowchart showing a flow of operations of the learning system according to a variation of the second example embodiment.

As shown in FIG. 10, when the learning system 10 according to the variation of the second example embodiment operates, first, the synthetic image generation unit 110 acquires the image data set of the original images (Step S101).

Subsequently, the reflection component extraction unit 140 acquires a reflection image data set (Step S201). Then, the reflection component extraction unit 140 acquires from the reflection image data set, the reflection images, the number of which accords with a predetermined batch size (Step S151).

Subsequently, the reflection component extraction unit 140 extracts the reflection component from the acquired reflection image acquired (Step S202). The reflection component extraction unit 140 outputs the extracted reflection components to the synthetic image generation unit 110.

Subsequently, the synthetic image generation unit 110 acquires the training data each piece thereof consisting of a pair of the correct answer and the original image from the acquired image data set, the number of pieces of the training data according with a predetermined batch size (Step S150). Then, the synthetic image generation unit 110 synthesizes the reflection component extracted by the reflection component extraction unit 140 with the acquired original image (Step S102). The synthetic image generation unit 110 outputs the generated synthetic image to the iris information estimation unit 120.

Subsequently, the iris information estimation unit 120 estimates the information on the iris based on the synthetic images generated by the synthetic image generation unit 110 (Step S103). Then, the learning unit 130 performs the learning process for the iris information estimation unit 120 based on the estimated information estimated by the iris information estimation unit 120 and the correct answer information in the original image (Step S103). (Step S104).

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S201.

(Effects of Variation)

Next, we will explain the technical effects obtained by the learning system 10 according to the variation of the second example embodiment.

As explained in FIG. 10, in the learning system 10 for the variation of the second example embodiment, each time the process loops, the reflection component is extracted, and by synthesizing the reflection component, the synthetic image is generated. In such a case, similarly to the second example embodiment already described, the reflection component to be used for synthesis with the original image can be obtained by a predetermined extraction process. In addition, since the reflection component that may occur when an image is actually taken is extracted, the extracted reflection component can be used to expand the data for learning. Thereby, it is possible to learn a model more robust to changes in the environment.

Third Example Embodiment

The learning system 10 according to a third example embodiment will be described with reference to FIGS. 11 and 12. The third example embodiment differs only in some configurations and operations compared to the first and second example embodiments described above, and the other parts are the same as in the first and second example embodiments. For this reason, in the following, the parts that overlap with the example embodiments already described will be omitted as appropriate.
(Functional Configuration)

First, with reference to FIG. 11, a functional configuration of the learning system 10 for the third example embodiment will be described. FIG. 11 is a block diagram showing the functional configuration of the learning system according to the third example embodiment. In FIG. 11, the reference signs same as in FIG. 7 are assigned the elements similar to in FIG. 7 respectively.

Figure 11:
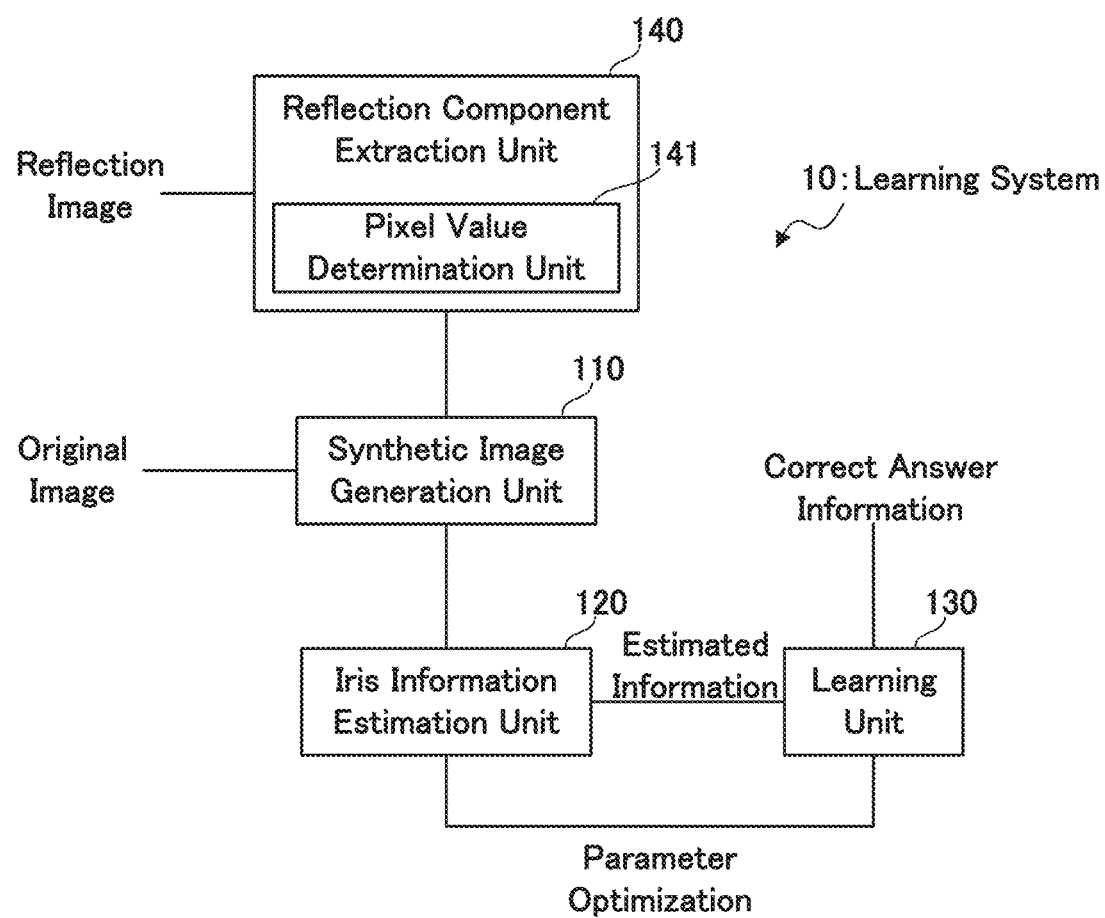
FIG. 11 is a block diagram showing a functional structure of the learning system according to the third example embodiment.

As shown in FIG. 11, the learning system 10 according to the third example embodiment comprises, as processing blocks for realizing functions of the learning system 10, a synthetic image generation unit 110, an iris information estimation unit 120, a learning unit 130, and a reflection component extraction unit 140. In particular, the learning system 10 according to the third example embodiment comprises a pixel value determination unit 141 in the reflection component extraction unit 140.

The pixel value determination unit 141 is configured to determine a pixel value of each pixel in the reflection image and extract as the reflection component, pixels (areas) whose pixel values are equal to a predetermined threshold value or higher. The "predetermined threshold value" here is a threshold value for determining a pixel containing a reflection component, and is set, for example, as a hyperparameter for learning. The predetermined threshold value may be set, for example, as a value between 200 and 255 (i.e., a value that can discriminate pixels having relatively high pixel values).

The predetermined threshold value may be a variable value. The predetermined threshold value may be selected from a plurality of prepared values according to the situation. In this case, the predetermined threshold value may be a value that can be changed or selected by a system administrator or others. The predetermined threshold value may also be set as a value that is changed or selected according to the input reflection image. For example, the predetermined threshold value may be a value linked to an average pixel value of the reflection image, or the like. When the reflection image is relatively dark, the predetermined threshold value may be set to a low value, and when the reflection image is relatively bright, the predetermined threshold value may be set to a high value.
(Operation Flow)

Next, a flow of operations of the learning system 10 according to the third example embodiment will be described with reference to FIG. 12. FIG. 12 is a flowchart showing the flow of operations of the learning system according to the third example embodiment. In FIG. 12, the reference signs as in FIG. 9 are assigned to the processes similar to in FIG. 9 respectively.

Figure 12:
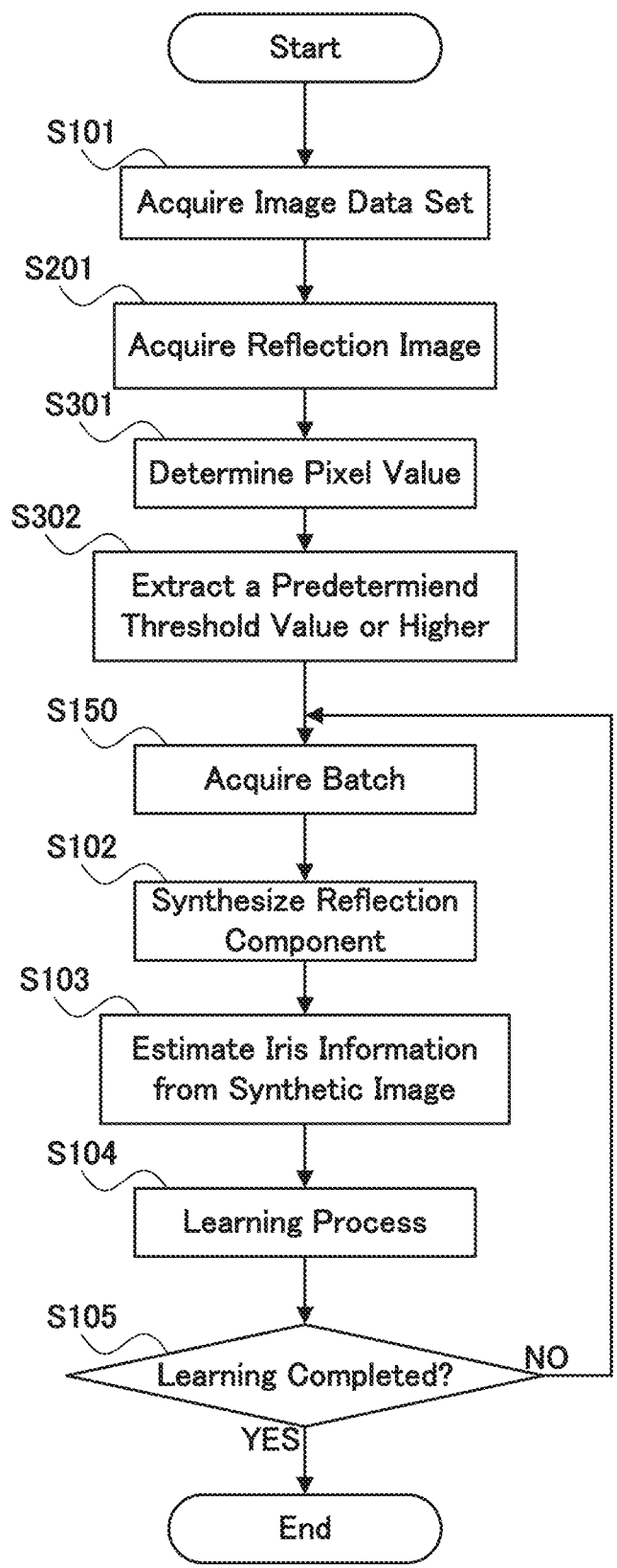
FIG. 12 is a flowchart showing a flow of operations of the learning system according to the third example embodiment.

As shown in FIG. 12, when the learning system 10 according to the third example embodiment operates, first, the synthetic image generation unit 110 acquires the image data set of the original images (Step S101).

Subsequently, the reflection component extraction unit 140 acquires the reflection image (Step S201). Then, the pixel value determination unit 141 determines the pixel values of the acquired reflection image (Step S301). Then, the pixel value determination unit 141 extracts as the reflection component, the area containing pixels whose pixel values are equal to the predetermined value or higher (Step S302). Two or more reflection images may be used. In this case, the reflection component may be generated from each of the two or more reflection images.

Subsequently, the synthetic image generation unit 110 acquires the training data each piece thereof consisting of a pair of the correct answer and the original image from the acquired image data set, the number of pieces of the training data according with a predetermined batch size (Step S150). Then, the synthetic image generation unit 110 synthesizes with the acquired original image, the reflection component extracted by the reflection component extraction unit 140 (i.e., the component corresponding to the pixels whose pixel value is determined to be equal to a predetermined value or higher by the pixel value determination unit 141) (Step S102). The synthetic image generation unit 110 outputs the generated synthetic image to the iris information estimation unit 120. When there are two or more reflection components, the reflection component randomly selected from the two or more reflection images may be synthesized with the original image.

Subsequently, the iris information estimation unit 120 estimates the information on the iris based on the synthetic image generated by the synthetic image generation unit 110 (Step S103). Then, the learning unit 130 performs the learning process for the iris information estimation unit 120 based on the estimated information estimated by the iris information estimation unit 120 and the correct answer information in the original image (Step S104).

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S150.
(Technical Effects)

Next, the technical effects obtained by the learning system 10 according to the third example embodiment will be explained.

As explained in FIGS. 11 and 12, in the learning system 10 according to the third example embodiment, the area in the reflection image where the pixel value is equal to the predetermined threshold value or higher is extracted as the reflection component. Thereby, the reflection component extracted from the reflection image is synthesized with the original image to obtain more difficult training data. Therefore, it is possible to learn a model robust to the reflection component. The above example embodiment describes, as one example, that the reflection component is extracted by comparing the pixel value to the threshold value. However, if a parameter other than the pixel value can be used to discriminate whether or not each pixel can be a reflection component, a threshold value for that parameter may be set to extract the reflection component.

Variation of the Third Example Embodiment

The learning system 10 according to a variation of the third example embodiment will be described with reference to FIG. 13. The variation described below differs only in some operations compared to the third example embodiment, and the other parts may be the same as in the third example embodiment. For this reason, in the following, the parts that differ from the third example embodiment already described will be explained in detail, and descriptions of other overlapping parts will be omitted as appropriate.

(Operations of Variation)

First, a flow of operations of the learning system 10 according to the variation of the third example embodiment will be explained with reference to FIG. 13. FIG. 13 is a flowchart showing the flow of operations of the learning system according to the variation of the third example embodiment. In FIG. 13, the reference signs same as in FIG. 12 are assigned to the processes similar to in FIG. 12 respectively.

Figure 13:
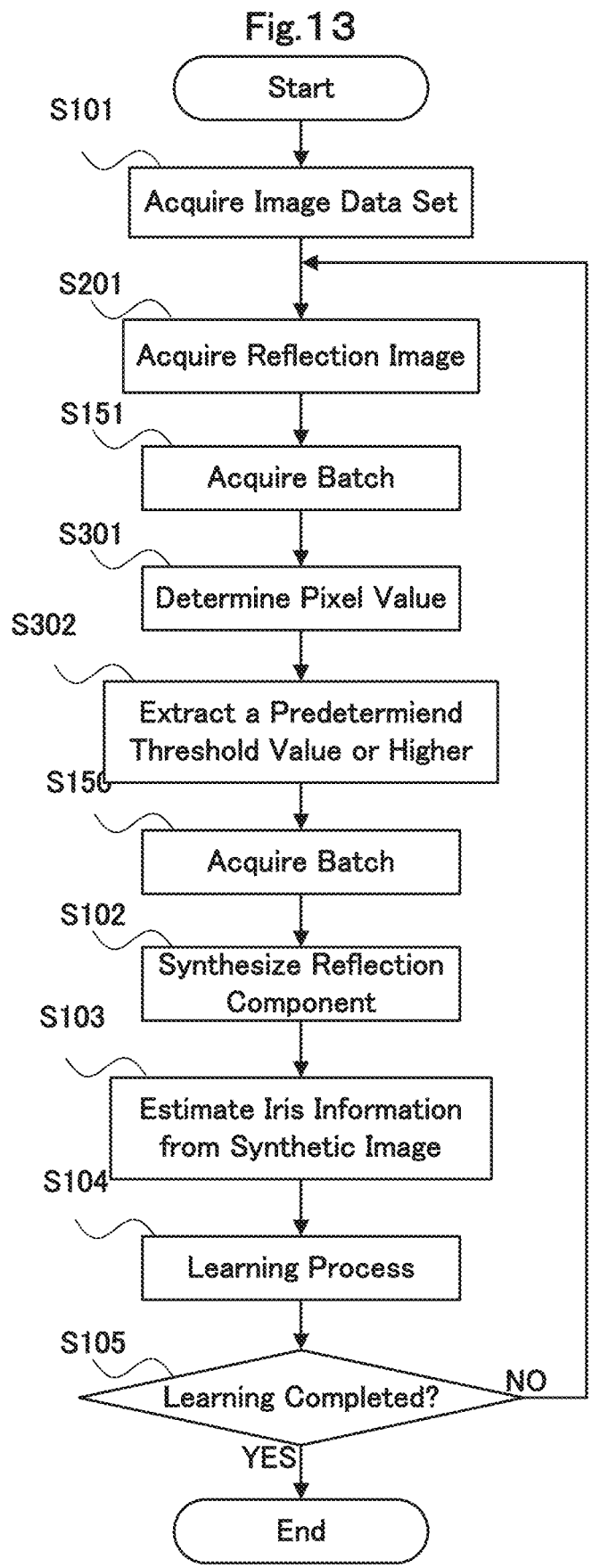
FIG. 13 is a flowchart showing a flow of operations of the learning system according to a variation of the third example embodiment.

As shown in FIG. 13, when the learning system 10 according to the variation of the third example embodiment operates, first, the synthetic image generation unit 110 acquires the image data set of the original images (Step S101).

Subsequently, the reflection component extraction unit 140 acquires the reflection image data set (Step S201). Then, the reflection component extraction unit 140 acquires from the reflection image data set, the reflection images, the number of which accords with a predetermined batch size (Step S151).

After that, the pixel value determination unit 141 determines the pixel values of the acquired reflection image (Step S301). Then, the pixel value determination unit 141 extracts as the reflection component, the area containing pixels whose pixel value is equal to a predetermined value or higher (Step S302).

Subsequently, the synthetic image generation unit 110 acquires the training data each piece thereof consisting of a pair of the correct answer and the original image from the acquired image data set, the number of pieces of the training data according with a predetermined batch size (Step S150). Then, the synthetic image generation unit 110 synthesizes with the acquired original image, the reflection component extracted by the reflection component extraction unit 140 (i.e., the component corresponding to the pixels whose pixel value is determined to be equal to a predetermined value or higher by the pixel value determination unit 140) (Step S102). The synthetic image generation unit 110 outputs the generated synthetic image to the iris information estimation unit 120.

Subsequently, the iris information estimation unit 120 estimates the information on the iris based on the synthetic image generated by the synthetic image generation unit 110 (Step S103). Then, the learning unit 130 performs the learning process for the iris information estimation unit 120 based on the estimated information estimated by the iris information estimation unit 120 and the correct answer information in the original image (Step S104).

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S105.

(Effects of Variation)

Next, the technical effects obtained by the learning system 10 according to the variation of the third example embodiment will be explained.

As explained in FIG. 13, in the learning system 10 according to the variation of the third example embodiment, the reflection component is acquired each time the processing loops, and the area in the reflection image where the pixel value is the predetermined threshold value is extracted as the reflection component. Thereby, since a different reflection component is acquired for each batch, the difficulty of the training data is increased, and a model that is more robust to the reflection components can be learned.

Fourth Example Embodiment

The learning system 10 according to a fourth example embodiment will be described with reference to FIGS. 14 through 16. The fourth example embodiment differs only in some configurations and operations compared to the first through third example embodiments described above, and the other parts may be the same as in the first through third example embodiments. For this reason, in the following, the parts that overlap with the example embodiments already described will be omitted as appropriate.

(Functional Configuration)

First, with reference to FIG. 14, a functional configuration of the learning system 10 according to the fourth example embodiment will be described. FIG. 14 is a block diagram showing the functional configuration of the learning system according to the fourth example embodiment. In FIG. 14, the reference signs same as in FIG. 2 are assigned to the elements similar to in FIG. 2 respectively.

Figure 14:
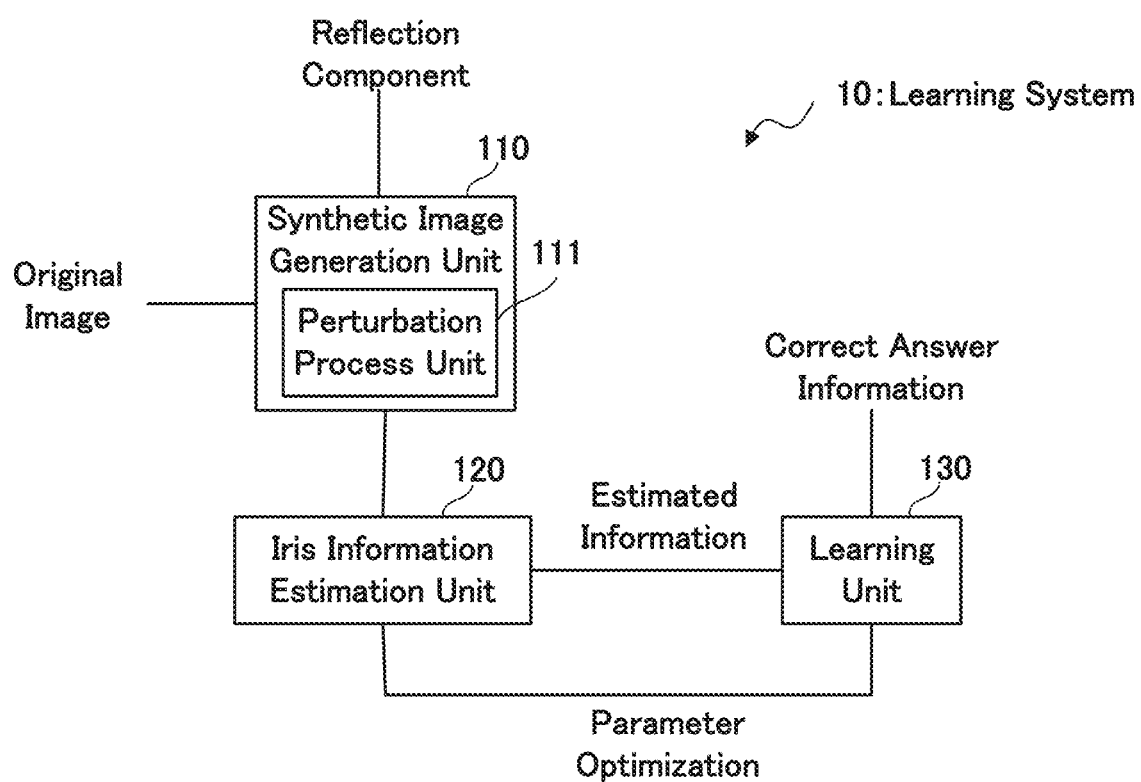
FIG. 14 is a block diagram showing a functional structure of the learning system according to the fourth example embodiment.

As shown in FIG. 14, the learning system 10 according to the fourth example embodiment comprises a synthetic image generation unit 110, an iris information estimation unit 120, and a learning unit 130 as processing blocks for realizing the functions of the learning system 10. In particular, in the learning system 10 according to the fourth example embodiment, the synthetic image generation unit 110 comprises a perturbation process unit 111.

The perturbation process unit 111 is configured to perform various processes to provide perturbation to the reflection component to be synthesized with the original image. Specifically, the perturbation process unit 111 is configured to perform at least one of the following processes for the reflection component: "movement," "rotation," "enlargement," and "reduction. The processes performed by the perturbation process unit 111 will be explained in detail below.

Examples of Perturbation Process

Next, the perturbation process by the perturbation process unit 111 described above will be explained with specific examples, referring to FIG. 15. FIG. 15 is a conceptual diagram showing an example of perturbation process for the reflection component.

As shown in FIG. 15, the perturbation process unit 111 may be configured to perform a movement process of the reflection component. In the movement process, the position of the reflection component is moved in a up and down direction, in a left and right direction, or in a diagonal direction. The amount of movement and the direction of movement in the movement process may be set in advance, may be changed as appropriate by a user or the like, or may be set randomly according to a random number. When the movement process is executed two or more times, the amount of movement and the direction of movement may be each the same every time, or may be each changed for each time.

The perturbation process unit 111 may be configured to perform a rotation process of the reflection component. In the rotation process, the reflection component is rotated clockwise or counterclockwise. Alternatively, the rotation process may perform a three-dimensional rotation that includes the depth direction of the image. The axis of rotation may be the center of the image, or any other coordinate. The axis of rotation may be an inner or outer coordinate of the image. The amount of rotation, the direction of rotation, and the coordinates of the axis of rotation in the rotation process may be set in advance, may be changed as appropriate by the user or the like, or may be set randomly according to a random number. When the rotation process is executed two or more times, the amount of rotation, the direction of rotation, and the coordinates of the rotation axis may be each the same every time, or may be each changed for each time.

The perturbation process unit 111 may be configured to perform an enlargement process of the reflection component. In the enlargement process, the size of the reflection component is changed so as to be larger. The amount of enlargement and the enlargement percentage in the enlargement process may be set in advance, may be changed by a user or the like as appropriate, or may be set randomly according to a random number. When the enlargement process is executed two or more times, the amount of enlargement and the enlargement percentage may be each the same every time or may be each changed for each time.

The perturbation process unit 111 may be configured to perform a reduction process of the reflection component. In the reduction process, the size of the reflection component is changed so as to be smaller. The amount of reduction and the reduction percentage in the reduction process may be set in advance, may be changed by a user or the like as appropriate, or may be set randomly according to a random number. When the reduction process is executed two or more times, the amount of reduction and the reduction percentage may each be the same every time, or may be each changed for each time.

The above mentioned movement, rotation, enlargement, and reduction processes may be performed in combination. For example, both the position of and the angle of the reflection component may be changed by simultaneously executing the movement process and the rotation process. Or, both the angle of and the size of the reflection component may be changed by simultaneously executing the rotation process and the enlargement process. Or, both the position of and the size of the reflection component may be changed by simultaneously executing the movement process and the reduction process. The combination of processes may be changed as necessary. For example, which processes are combined to be executed may be determined according to user's operation, or may be changed randomly.

When the perturbation process is divided into two or more times, different processes may be executed sequentially. For example, the first time the movement process may be executed, the second time the rotation process may be executed, the third time the enlargement process may be executed, and the fourth time the reduction process may be executed. The order in which the processes are performed may be changed as necessary. For example, it may be determined according to user's operation which process should be executed in which order may be determined, or it may be determined randomly.

If the reflection component is divided into two or more areas, the perturbation process may be executed in each area individually. For example, as shown in FIG. 15, if the reflection component is divided into three rectangular areas, the first rectangular area may be subjected to the movement process, the second rectangular area may be subjected to the rotation process, and the third rectangular area may be subjected to the enlargement process. Specifically, each area may be placed in a different channel, and a random number may be used to select which channel to execute the perturbation process and which channel not to. It can be changed as appropriate which process is executed to which area. For example, which process is executed to which area may be decided in accordance with user's operation, or may be decided randomly.

The perturbation process unit 111 may always perform the perturbation process or may omit the perturbation process as appropriate. For example, the perturbation process may not be performed for the synthetic image first generated, and the perturbation process may be performed for the synthetic image second generated. A random number may be used to determine whether or not to perform the perturbation process at the time of generating the synthetic image. For example, a uniform random number in the range of 1 through 0 may be used, and if the obtained random number value is 0.5 or higher, the perturbation process may be executed, otherwise, the perturbation process may not be executed. Or, if the reflection component is divided into two or more areas, some areas may be subject to the perturbation process and the others may not be. For example, as shown in FIG. 15, if the reflection component is divided into three rectangular areas, the perturbation process may not be performed to the first rectangular area, but may be performed only to the second rectangular area and the third rectangular area. Alternatively, the perturbation process may be performed to the first rectangular area and the second rectangular area, and may not be performed only to the third rectangular area. It may be determined randomly whether or not to perform the perturbation process for each area.

(Operation Flow)

Next, a flow of operations of the learning system 10 according to the fourth example embodiment will be described with reference to FIG. 16. FIG. 16 is a flowchart showing the flow of operations of the learning system according to the fourth example embodiment. In FIG. 16, the reference signs same as in FIG. 4 are assigned to the processes similar to in FIG. 4 respectively.

Figure 16:
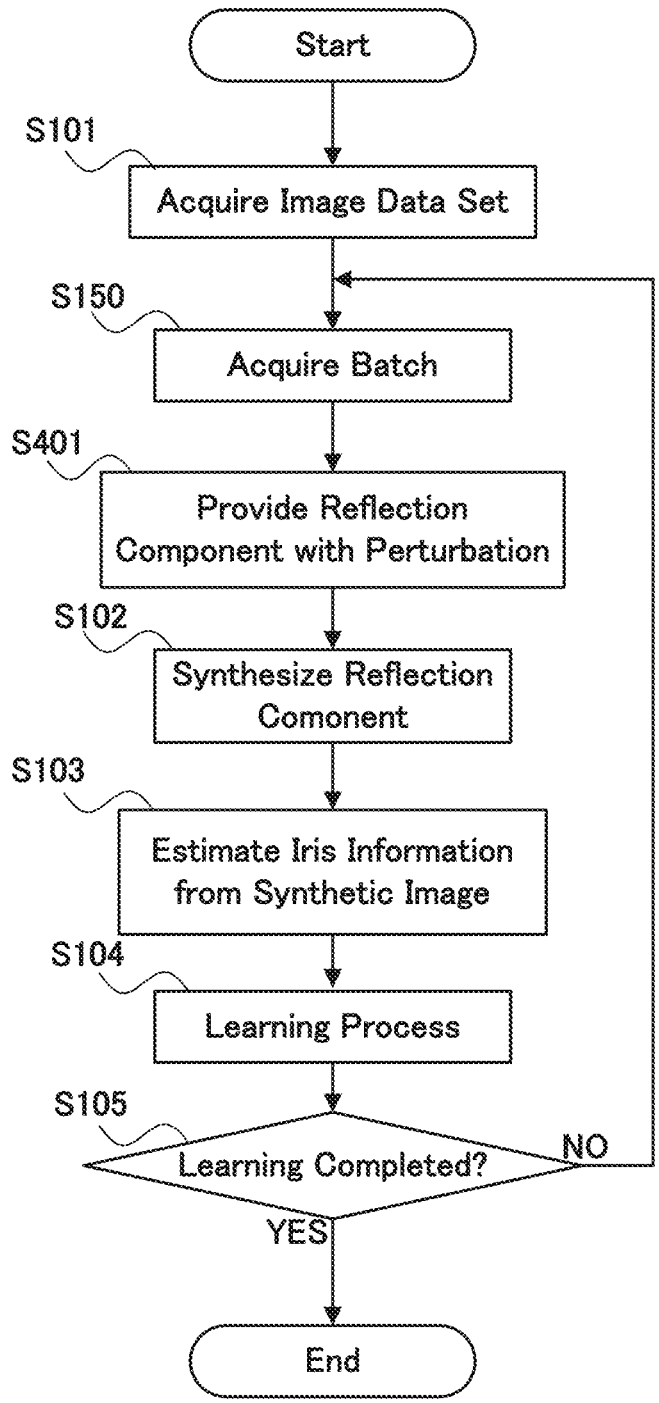
FIG. 16 is a flowchart showing a flow of operations of the learning system according to the fourth example embodiment.

As shown in FIG. 16, when the learning system 10 according to the fourth example embodiment operates, first, the synthetic image generation unit 110 acquires an image data set of the original images (Step S101). Then, the training data each piece thereof consisting of a pair of the correct answer and the original image from the acquired image data set is acquired, the number of pieces of the training data according with a predetermined batch size (Step S150).

Subsequently, the perturbation process unit 111 performs perturbation process to the reflection component to provide perturbation (Step S401). Then, the synthetic image generation unit 110 synthesizes the reflection component provided with the perturbation with the acquired original image (Step S102). The synthetic image generation unit 110 outputs the generated synthetic image to the iris information estimation unit 120.

Subsequently, the iris information estimating unit 120 estimates the information on the iris based on the synthetic image generated by the synthetic image generation unit 110 (Step S103). Then, based on the estimated information on the iris estimated by the iris information estimation unit 120 and the correct answer information in the original image, the learning unit 130 performs the learning process for the iris information estimation unit 120 (Step S104)

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S150. As already explained, at the second or subsequent round of Step S401, a perturbation process different from at the first round may be executed.

(Technical Effects)

Next, the technical effects obtained by the learning system 10 of the fourth example embodiment will be described.

As explained in FIGS. 14 through 16, in the learning system 10 of the fourth example embodiment, the perturbation process is performed to the reflection component previous to the synthesis. Thereby, it is possible to synthesize a single reflection component with the original image in different ways. Therefore, more than one synthetic image can be generated from a single original image and a single reflection component. Accordingly, it is possible to expand the images used for learning efficiently.

Fifth Example Embodiment

The learning system 10 according to a fifth example embodiment will be described with reference to FIGS. 17 through 19. The fifth example embodiment differs only in some configurations and operations compared to the first through fourth example embodiments described above, and the other parts are same as in the first through fourth example embodiments. For this reason, in the following, the parts that overlap with the example embodiments already described will be omitted as appropriate.

(Functional Configuration)

First, with reference to FIG. 17, a functional configuration of the learning system 10 according to the fifth example embodiment will be described. FIG. 17 is a block diagram showing the functional configuration of the learning system according to the fifth example embodiment. In FIG. 17, the reference signs same as in FIG. 2 are assigned to the elements similar to in FIG. 2 respectively.

Figure 17:
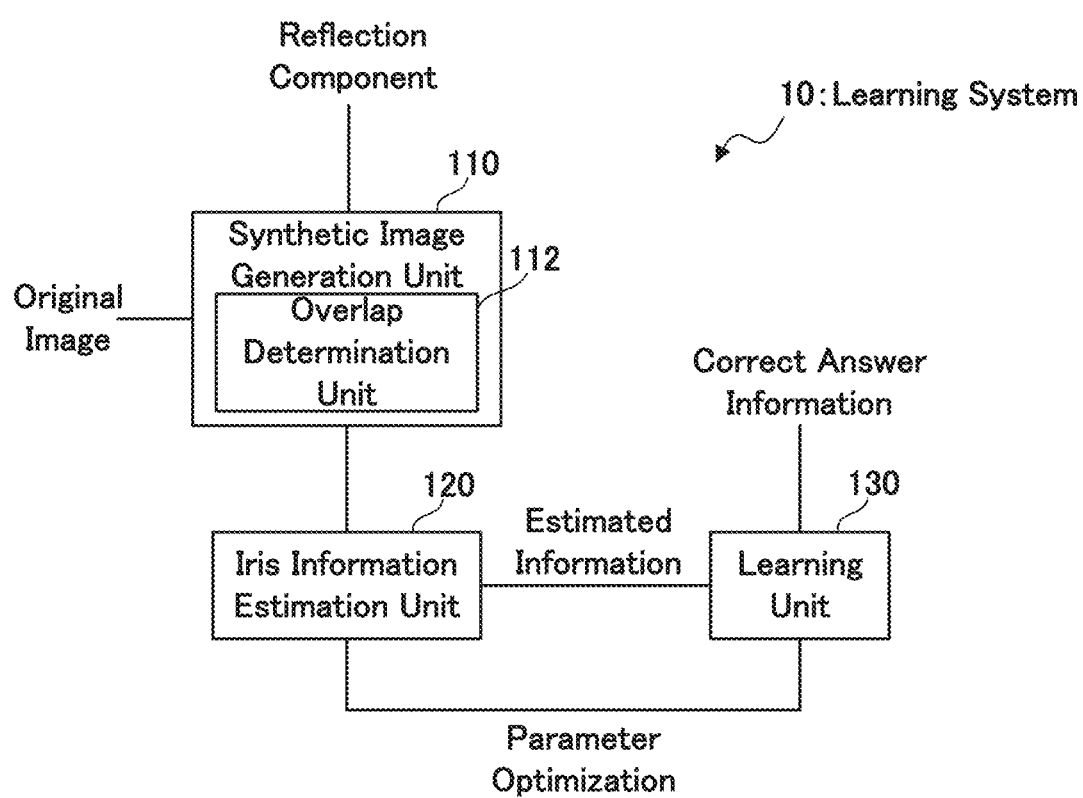
FIG. 17 is a block diagram showing a functional structure of the learning system according to the fifth example embodiment.

As shown in FIG. 17, the learning system 10 of the fifth example embodiment comprises, as processing blocks for realizing the functions of the learning system 10, a synthetic image generation unit 110, an iris information estimation unit 120, and a learning unit 130. In particular, in the learning system 10 according to the fifth example embodiment, the synthetic image generation unit 110 has an overlap determination unit 12.

The overlap determination unit 112 is configured to determine whether or not a specific portion of a living body and the reflective component at least partially overlap each other when the reflective component is synthesized with the original image. For example, it is possible to determine whether or not the specific portion of the living body and the reflection component overlap each other, by obtaining a positional information of the specific portion of the living body in advance. For example, the correct answer information input to the learning unit 130, or information estimated from the original image may be used as the positional information of the specific portion.

In addition, the overlap determination unit 112 is configured to change the position, angle, size, etc. of the reflection component so that the specific portion of the living body overlaps with the reflection component when it is determined that the reflection component does not overlap with the specific portion of the living body. When the synthetic image generation unit 110 has the perturbation process unit 111 (FIG. 14) described in the fourth example embodiment, the overlap determination unit 112 may output instructions to the perturbation process unit 111 to perform the perturbation process so that the specific portion of the living body overlaps with the reflection component. Specifically, the instructions may be issued so that the reflection component overlaps with the specific portion of the living body caused by at least one of the following processes to the reflection component: the movement process, the rotation process, the enlargement process, and the reduction process.

Example of Overlap Determination

Next, with reference to FIG. 18, the overlap determination of the reflection component by the overlap determination unit 112 described above will be explained with specific examples. FIG. 18 is a conceptual diagram showing an example of determining the overlap between the iris and the reflection component.

Figure 18A:
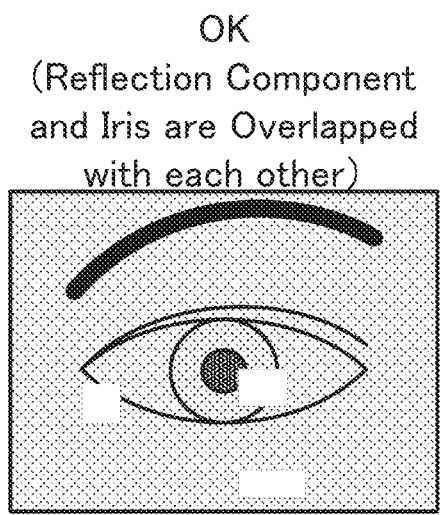
FIG. 18 is a conceptual diagram showing an example that the overlap of the iris and the reflection component is determined.

In the example shown in FIG. 18A, the position of the rectangular area, which is the reflection component, overlaps with the iris, which is the specific portion of the living body. In this case, the reflection component hides part of the iris. Therefore, this case makes it difficult to estimate the information on the iris from the synthetic image. Accordingly, such a synthetic image is appropriate training data for learning on the assumption of existence of the reflection component. Therefore, in this case, there is no need to change the position of the reflection component.

Figure 18B:
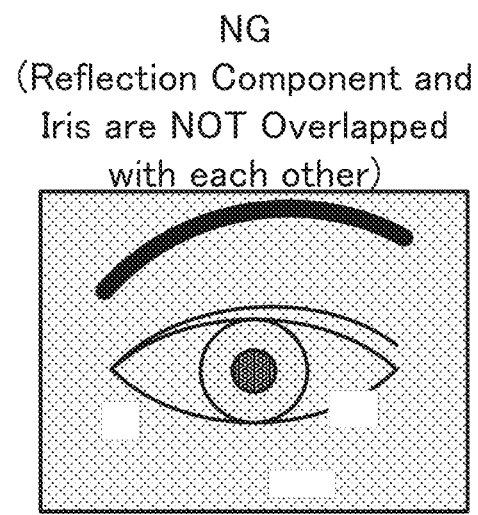

On the other hand, in the example shown in FIG. 18B, none of the rectangular areas, which are the reflection component, overlap with the iris, which is the specific portion of the living body. In this case, since the iris is not hidden by the reflection component, it is relatively easy to estimate the information on the iris from the synthetic image. Therefore, such a synthetic image is not appropriate (not useless, but relatively ineffective) training data for learning on the assumption of existence of the reflective component. Therefore, in this case, it is preferable to change the position of the reflection component so that one of the rectangular areas overlaps with the iris.

A degree of overlap between the specific portion of the living body and the reflection component may be determined in advance as a hyperparameter. For example, in some cases it is appropriate to make the specific portion of the living body and the reflection component overlap with each other as largely as possible, while in other cases it is appropriate to avoid too much overlap. The hyperparameter may be set in consideration of such conditions. The degree of overlap between the specific portion of the living body and the reflection component may be constant at all times, or it may be changed each time the synthesis process is performed.

Even in the case where the specific portion of the living body and the reflection component do not overlap with each other, by at least positioning the reflection component around the specific portion of the living body (i.e., bringing the specific portion of the living body and the reflection component closer to each other), the technical effects described below can be reasonably obtained. Therefore, the overlap determination unit 112 may determine whether a distance between the specific portion of the living body and the reflection component is within a predetermined range, instead of determining whether the specific portion of the living body and the reflection component overlap with each other. In this case, the predetermined range can be set in advance to be an appropriate value (i.e., a value that enables more effective learning). It is also possible to determine probabilistically whether or not the reflection component overlaps with the specific portion of the living body. For example, the reflection component may be synthesized so as to overlap with a probability of 0.5 and not to overlap with a probability of 0.5. In addition to whether the reflection component overlaps with the specific portion or not, the degree of overlap and the probability that they are located in the vicinity may also be determined probabilistically in advance.

(Operation Flow)

Next, a flow of operations of the learning system 10 according to the fifth example embodiment will be described with reference to FIG. 19. FIG. 19 is a flowchart showing the flow of operations of the learning system according to the fifth example embodiment. In FIG. 19, the reference signs same as in FIG. 4 are assigned to the processes similar to in FIG. 4 respectively.

Figure 19:
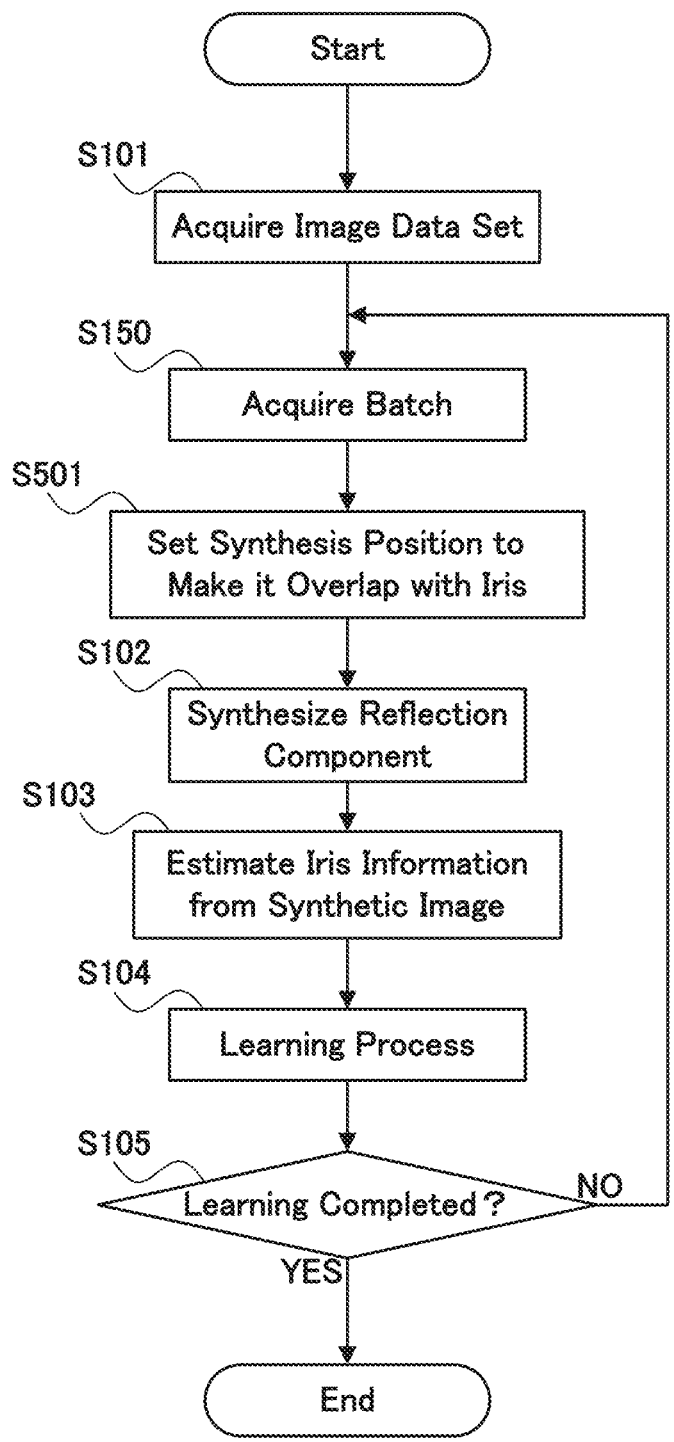
FIG. 19 is a flowchart of a flow of operations of the learning system according to the fifth example embodiment.

As shown in FIG. 19, when the learning system 10 according to the fifth example embodiment operates, first, the synthetic image generation unit 110 acquires an image data set of the original images (Step S101). Then, the training data each piece thereof consisting of a pair of the correct answer and the original image from the acquired image data set, the number of pieces of the training data according with a predetermined batch size (Step S150).

Subsequently, the overlap determination unit 112 determines whether or not the specific portion of the living body and the reflection component overlap with each other, and determines a synthesis position so that the specific portion of the living body and the reflection component overlap with each other (Step S501). Then, the synthetic image generation unit 110 synthesizes the reflection component with the original image based on the synthesis position determined by the overlap determination unit 112 (Step S102). The synthetic image generation unit 110 outputs the generated synthetic image to the iris information estimation unit 120.

Subsequently, the iris information estimation unit 120 estimates the information on the iris based on the synthetic image generated by the synthetic image generation unit 110 (Step S103). Based on the estimated information on the iris estimated by the iris information estimation unit 120 and the correct answer information in the original image, the learning unit 130 performs the learning process for the iris information estimation unit 120 (Step S104)

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S150. As already explained, at the second or subsequent round of Step S501, the synthesis position may be determined so that the degree of overlap changes from the degree at the first round.

(Technical Effects)

Next, the technical effects obtained by the learning system 10 according to the fifth example embodiment will be described.

As explained in FIGS. 17 through 19, in the learning system 10 according to the fifth example embodiment, the reflection component is synthesized in such a way that the reflection component at least partially overlaps with the specific portion of the living body. As explained in FIGS. 17 through 19, in the learning system 10 according to the fifth example embodiment, the reflection component is synthesized so as to overlap at least partially with the specific portion of the living body. Therefore, it is possible to generate appropriate synthetic images for learning the iris information estimation unit 120. Accordingly, it is possible to efficiently perform learning for the iris information estimation unit 120.

Sixth Example Embodiment

The learning system 10 according to a sixth example embodiment will be described with reference to FIGS. 20 through 22. The sixth example embodiment differs only in some configurations and operations compared to the first through fifth example embodiments described above, and the other parts may be the same as in the first through fifth example embodiments. For this reason, in the following, the parts that overlap with the example embodiments already described will be omitted as appropriate.

(Functional Configuration)

First, with reference to FIG. 20, a functional configuration of the learning system 10 according to the sixth example embodiment will be described. FIG. 20 is a block diagram showing the functional configuration of the learning system according to the sixth example embodiment. In FIG. 20, the reference signs same as in FIG. 2 are assigned to the elements similar to in FIG. 2 respectively.

Figure 20:
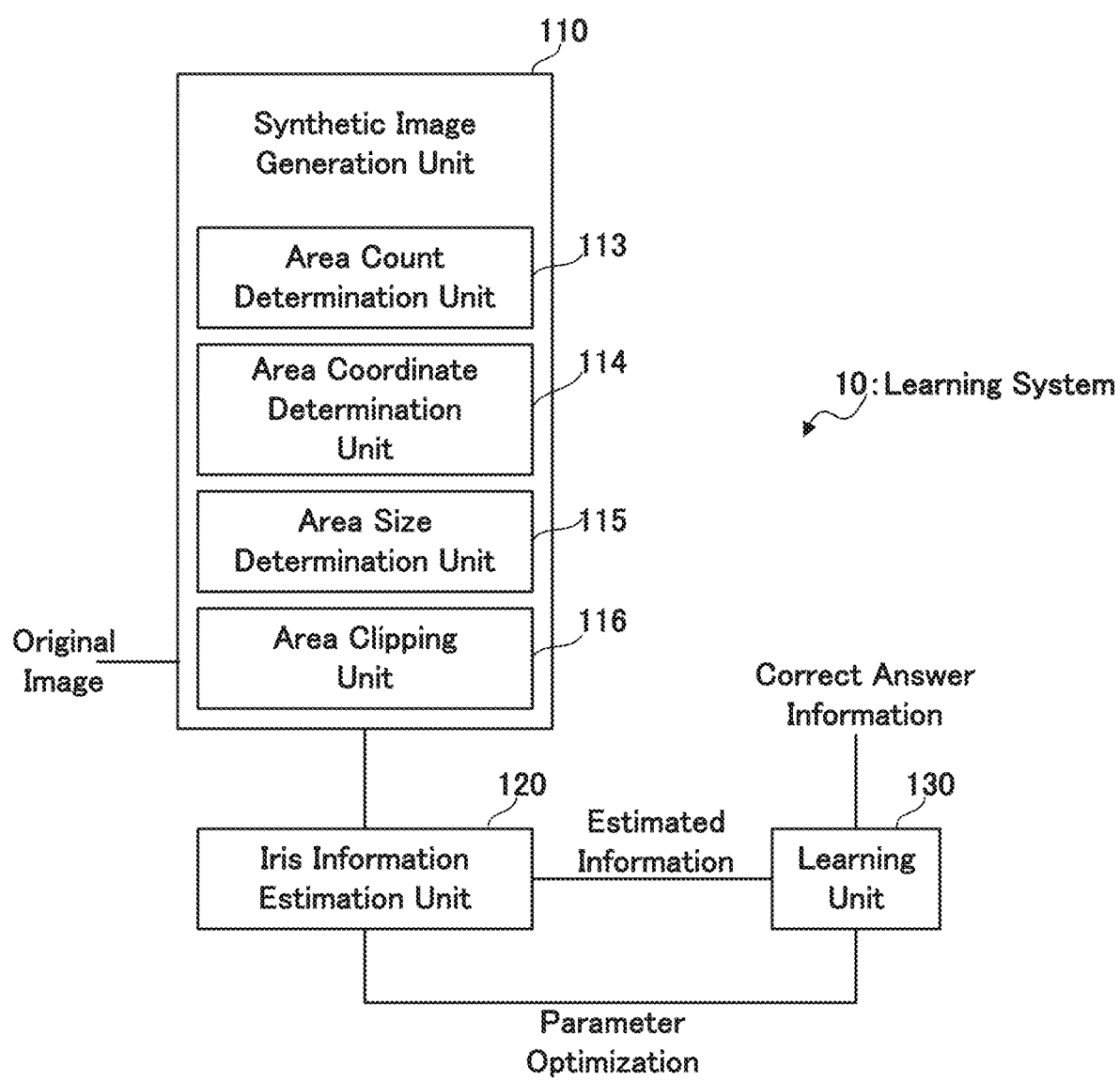
FIG. 20 is a block diagram showing a functional configuration of the learning system according to the sixth example embodiment.

As shown in FIG. 20, the learning system 10 according to the sixth example embodiment comprises, as processing blocks for realizing the functions of the learning system 10, a synthetic image generation unit 110, an iris information estimation unit 120, and a learning unit 130. In particular, in the learning system 10 according to the sixth example embodiment, the synthetic image generation unit 110 comprises: an area count determination unit 113, an area coordinate determination unit 114, and an area size determination unit 115, and an area clipping unit 116.

The reflection component is not input to the synthetic image generation unit 110 according to the sixth example embodiment. The synthetic image generation unit 110 according to the sixth example embodiment does not synthesize the reflection component input from the outside, but an area corresponding to the reflection component is determined by the area count determination unit 113, the area coordinate determination unit 114, and the area size determination unit 115, and the determined area is clipped by the area clipping unit 116 to generate a synthetic image (a clipping image) where the reflection component is reflected.

The area count determination unit 113 is configured to determine the number of areas to be clipped from an original image (i.e., the number of areas corresponding to the reflection component). The area count determination unit 113 may be configured to determine the number of areas randomly according to a random number, for example. Alternatively, the number of areas may be determined in response to user's operation. For example, a certain appropriate range (e.g., 1 through 5) may be set with respect to the number of areas, and the number of areas may be determined appropriately from that range.

The area coordinate determination unit 114 is configured to determine the coordinates of the area to be clipped from the original image (i.e., the position of the area corresponding to the reflection component). The area coordinate determining unit 114 may be configured to determine the area coordinates randomly according to a random number, for example. Alternatively, the area coordinate determination unit 114 may be configured to determine the area coordinates in response to a user operation. When there are two or more areas (i.e., when the number of areas is determined to be two or more), the area coordinate determination unit 114 may determine the coordinates for each area.

The area size determination unit 115 is configured to determine the size of the area to be clipped from the original image (i.e., the size of the area corresponding to the reflection component). The area size determination unit 115 may be configured to determine the area size randomly according to a random number, for example. Alternatively, the area size determination unit 115 may be configured to determine the area size in response to user's operation. When there are two or more areas (i.e., when the number of areas is determined to be two or more), the area size determination unit 115 may determine the size for each area.

The area clipping unit 116 is configured to clip from the original image, the area(s) determined by the area count determination unit 113, the area coordinate determination unit 114, and the area size determination unit 115. Specific examples of the clipping process will be described in detail below.

Example of Clipping Process

Figure 21:
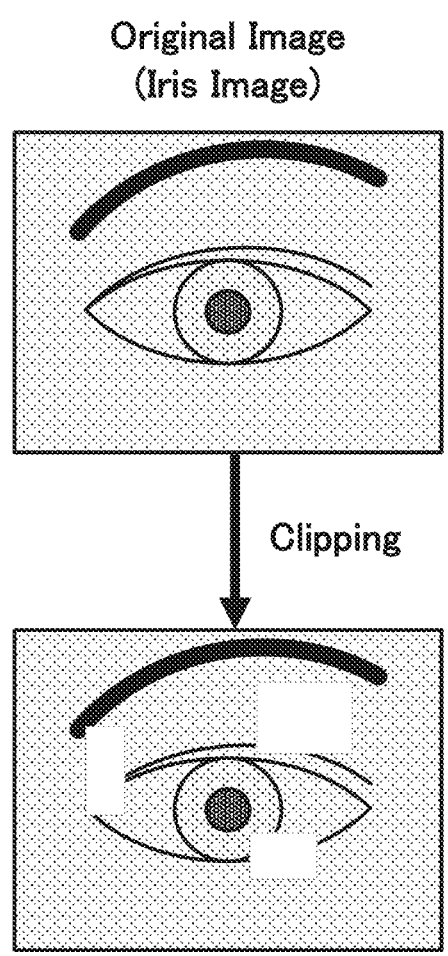
FIG. 21 is a conceptual diagram showing an example of the method of generating the synthetic image by clipping the original image.

Next, referring to FIG. 21, the above-mentioned synthetic image generation unit 110 (specifically, the area count determination unit 113, the area coordinate determination unit 114, the area size determination unit 115, and the area clipping unit 116) will be specifically described. FIG. 21 illustrates the clipping process of the original image. FIG. 21 is a conceptual diagram of an example of a method for generating a synthetic image by clipping of the original image.

As shown in FIG. 21, in the clipping process, the area corresponding to the reflection component (i.e., the area determined by the area count determination unit 113, the area coordinate determination unit 114, and the area size determination unit 115) is clipped from the original image. Since the area to be clipped from the original image is an area that imitates the reflection component, the area is not determined based on a specific reflection image or the like. However, the area to be clipped from the original image may be determined so as to be the reflection component close to the actual reflection image. In the illustrated example, the rectangular area is clipped. However, the shape is not limited to a rectangle. For example, other polygonal, circular, or oval areas may be clipped. If there are two are more areas to be clipped, the coordinates of and the size of the clipped areas may be determined independently for each area.

The clipped area is filled with a specific pixel value that is close to a pixel value of the actual reflection component. The pixel value of the clipped area may be set in a value range of 200-255, for example. The pixel value of the clipped area may be filled so that all pixels in one area have the same pixel value, or an individual pixel value may be selected for each pixel.

When more than one synthetic image is generated by the clipping process, the clipping process does not have to be performed on all synthetic images. For example, while an image where the clipping process has been performed may be used for the learning, an image where the clipping process has not been performed (i.e., an image that is still the original image) may be used for the learning. Whether or not to perform the clipping process may be determined according to a predetermined probability. When the clipping process is not performed, the area clipping unit 116 may be allowed not to perform the process, or the area count determination unit 113 may be allowed to determine that the number of areas is "0".

The clipping area may be set to a position around a feature point of the specific portion of the living body, for example. That is, the clipping process may be performed to obtain a synthetic image similarly to in the fifth example embodiment described above (i.e., a configuration in which the specific portion of the living body and the reflection component are made to overlap with each other). If there are two or more feature points of the specific portion, the clipping process may be performed after determining whether or not to perform the clipping process for each feature point. For example, if the iris is the specific portion, "an iris center," "a pupil center," "a portion on the iris circle," "an eyelid," etc. are sometimes used as the feature points. For each of these areas, it may be determined whether to perform the clipping process or not. More specifically, a random number may be generated for each feature point, and whether or not to perform the clipping process may be determined according to the value of the random number. For example, when a random number between 0 and 1 is generated, if the generated random number is greater than 0.5, the clipping process may be performed, and if the generated random number is equal to or less than 0.5, the clipping process may be not performed.

(Operation Flow)

Next, a flow of operations of the learning system 10 according to the sixth example embodiment will be described with reference to FIG. 22. FIG. 22 is a flowchart showing the flow of operations of the learning system according to the sixth example embodiment. In FIG. 22, the reference signs same as in FIG. 4 are assigned to the processes similar to in FIG. 4 respectively.

Figure 22:
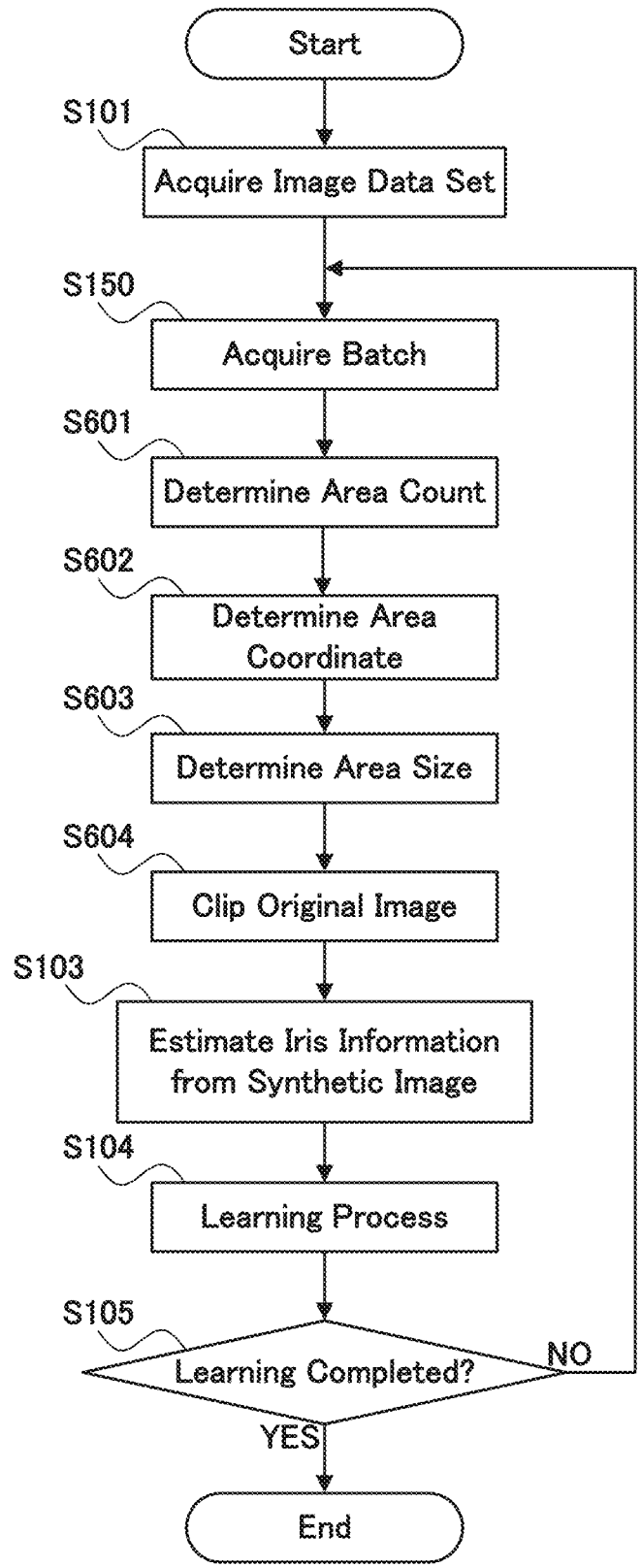
FIG. 22 is a flowchart showing a flow of operations of the learning system according to the sixth example embodiment.

As shown in FIG. 22, when the learning system 10 according to the sixth example embodiment operates, first, the synthetic image generation unit 110 acquires an image data set of the original images (Step S101). Then, the training data each piece thereof consisting of a pair of the correct answer and the original image from the acquired image data set, the number of pieces of the training data according with a predetermined batch size (Step S150).

Subsequently, the area count determination unit 113 determines the number of areas to be clipped (Step S601). Then, the area coordinate determination unit 114 determines the coordinates of the area to be clipped (Step S602). Then, the area size determination unit 115 determines the size of the area to be clipped (Step S603). Then, the area clipping unit 116 clips the determined area from the original image (Step S604). By these processes, a synthetic image reflecting the reflection component is generated with respect to the original image. The synthetic image generation unit 110 outputs the generated synthetic image to the iris information estimation unit 120.

Subsequently, the iris information estimation unit 120 estimates the information on the iris based on the synthetic image generated by the synthetic image generation unit 110 (Step S103). Then, based on the estimated information on the iris estimated by the iris information estimation unit 120 and the correct answer information in the original image, the learning unit 130 performs the learning process for the iris information estimation unit 120 (Step S104).

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may start again from Step S150. As already explained, at the second or subsequent round of Step S601, the number of areas different from at the first round of Step S601 may be determined. Similarly, at the second or subsequent round of Step S602, the area coordinates different from at the first round of Step S602 may be determined. At the second or subsequent round of Step S603, the area size different from at the first round of Step S603 may be determined.

(Technical Effects)

Next, the technical effects obtained by the learning system 10 according to the sixth example embodiment will be described.

As explained in FIGS. 20 to 22, in the learning system 10 according to the sixth example embodiment, a synthetic image (i.e., an image where the reflection component is reflected on the original image) is generated by the clipping process with respect to the area. Thereby, it is possible to easily generate the synthetic image that imitates the reflection component using only the original image. In other words, it is possible to generate an image for learning corresponding to the reflection component without acquiring the reflection component.

Seventh Example Embodiment

The learning system 10 according to a seventh example embodiment will be described with reference to FIGS. 23 through 25. Note that the seventh example embodiment differs only in some configurations and operations compared to the first through sixth example embodiments described above, and the other parts are the same as in the first through sixth example embodiments. For this reason, in the following, the parts that overlap with the example embodiments already described will be omitted as appropriate.

(Functional Configuration)

First, a functional configuration of the learning system 10 according to the seventh example embodiment will be described with reference to FIG. 23. FIG. 23 is a block diagram showing the functional configuration of the learning system according to the seventh example embodiment. In FIG. 23, the reference signs same as in FIG. 2 are assigned to the elements similar to in FIG. 2 respectively.

Figure 23:
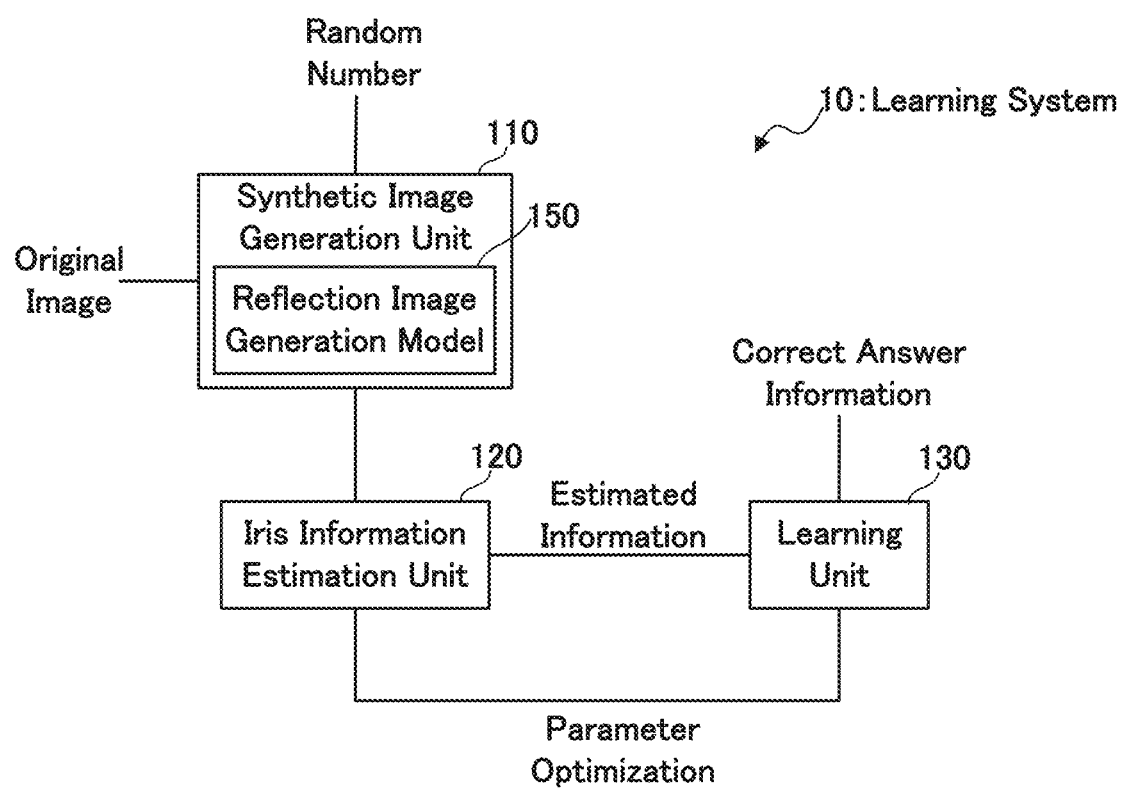
FIG. 23 is a block diagram showing a functional configuration of the learning system according to the seventh example embodiment.

As shown in FIG. 23, the learning system 10 of the seventh example embodiment comprises, as processing blocks for realizing the functions of the learning system 10, a synthetic image generation unit 110, an iris information estimation unit 120, and a learning unit 13. In particular, in the learning system 10 according to the seventh example embodiment, the synthetic image generation unit 110 comprises a reflection image generation model 150.

The reflection image generation model 150 is a model capable of generating a reflection image containing the reflective component from a non-reflection image containing no reflective component. The reflection image in this embodiment is an image used for learning for the iris information estimation unit 120, and corresponds to the synthetic image in each of the above-mentioned example embodiments. The reflection image generation model 150 is configured as a model learned by a neural network. The specific type of neural network here is not particularly limited, but one example is a generative adversarial network. In the following, there will be described an example that the reflection image generation model 150 is learned with the generative adversarial network. The reflection image generation model 150 takes the original image as input and the reflection image as output. In addition, the reflection image generation model 150 uses a random number as conditions for generating the reflection image. Therefore, the reflection image generation model 150 can output various reflection images depending on the input random number.

(Learning for the Reflection Image Generation Model)

Next, with reference to FIG. 24, a learning method for the reflection image generation model 150 described above will be explained specifically. FIG. 24 shows a block diagram of the learning method for the reflection image generation model 150 using CycleGAN.

Figure 24:
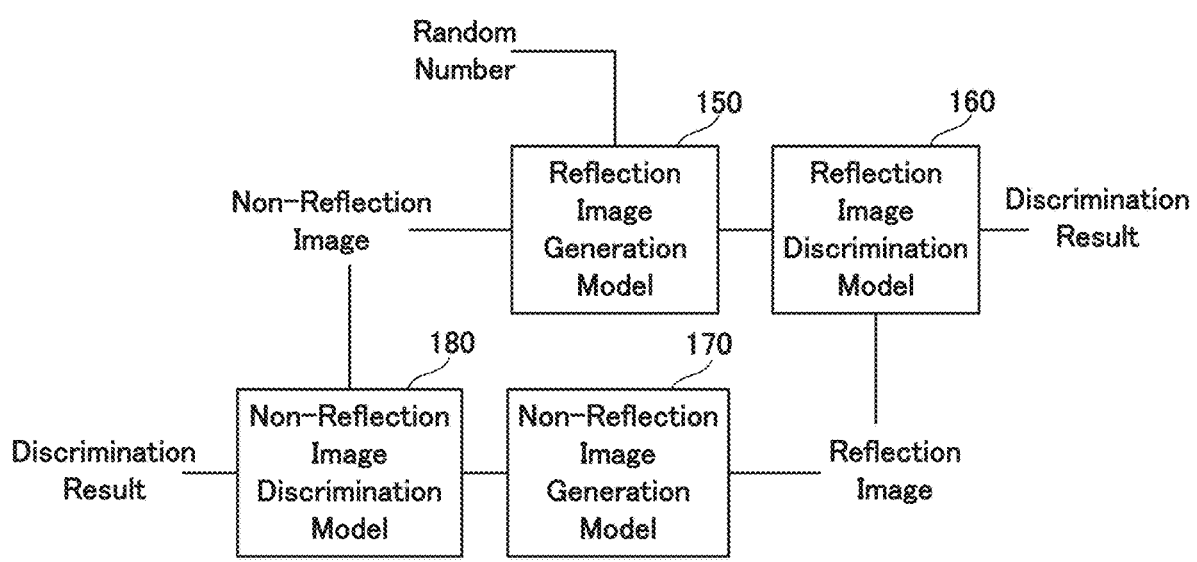
FIG. 24 is a block diagram showing the learning method for the reflection image generation model by CycleGAN.

As shown in FIG. 24, the reflection image generation model 150 is learned using CycleGAN. At the moment of the learning, the structure of the CycleGAN includes the reflection image generation model 150, a reflection image discrimination model 160, a non-reflection image generation model 170 and a non-reflection image discrimination model 180.

The reflection image generation model 150 takes a non-reflection image (i.e., an image that does not contain the reflection component) and a random number as input, and generates a reflection image. The reflection image discrimination model 160 takes the reflection image generated by the reflection image generation model 150 and a reflection image of training data (not generated by the reflection image generation model 150) as input, and outputs the discrimination result. The discrimination result of the reflection image discrimination model 160 is a binary value indicating true or false. By using the random number as the input of the reflection image generation model 150, the reflection image generation model 150 is capable of generating various reflection images. Thereby, it is possible to diversify the reflection component of the reflection image generated by the reflection image generation model 150.

The non-reflection image generation model 170 takes a reflection image (not generated by the reflection image generation model 150) as input and generates a non-reflection image. The non-reflection image discrimination model 180 takes as input, the non-reflection image generated by the non-reflection image generation model 170 and a non-reflection image of training data (not generated by the non-reflection image generation model 170), and outputs the discrimination result. The discrimination result of the non-reflection image discrimination model 180 is a binary value indicating true or false.

In the CycleGAN described above, the reflection image generation model 150 is optimized by calculating the adversarial loss so as to trap the reflection image discrimination model 160 (so as to make it determine a false reflection image as a true one). Also, the reflection image discrimination model 160 is optimized by calculating the adversarial loss so as not to be trapped by the reflection image generation model 150 (so as not to determine a false reflection image as a true one). Similarly, the non-reflection image generation model 170 is optimized by calculating the adversarial loss so as to trap the non-reflection image discrimination model 180 (so as to make it to determine a false non-reflection image as a true one). Further, the non-reflection image discrimination model 180 is optimized by calculating the adversarial loss so as not to be trapped by the non-reflection image generation model 170 (so as not to determine a false non-reflection image as a true one). At the same time, the generation models use, in addition to the adversarial loss, the reconstruction loss between the generated image and the input image obtained after repeated estimation such as: the reflection image, the non-reflection image, and the reflection image; and another reconstruction loss between the generated image and the input image obtained after repeated estimation such as: the non-reflective image, the reflective image, and the non-reflective image. The learning process described above should be terminated when a predetermined number of iterations is achieved.

Moreover, within the models mentioned above, used in the learning system 10 is only the reflection image generation model 150. However, each of the models with respect to the non-reflection image (i.e., the non-reflection image generation model 170 and the non-reflection image discrimination model 180) can also be each learned simultaneously. Thereby, it is no longer necessary to prepare an image pair (a pair of reflection and non-reflection images taken under the same conditions). Specifically, the reflection image generation model 150, the reflection image discrimination model 160, the non-reflection image generation model 170, and the non-reflection image discrimination model 180 are configured in a cyclic manner, it is only necessary to prepare, as a set of training data, data of non-reflection images collected and data of reflection images collected independently.

(Operation Flow)

Next, a flow of operations of the learning system 10 according to the seventh example embodiment will be described with reference to FIG. 25. FIG. 25 is a flowchart showing the flow of operations of the learning system according to the seventh example embodiment. In FIG. 25, the reference signs same as in FIG. 4 are assigned to the processes similar to in FIG. 4 respectively.

Figure 25:
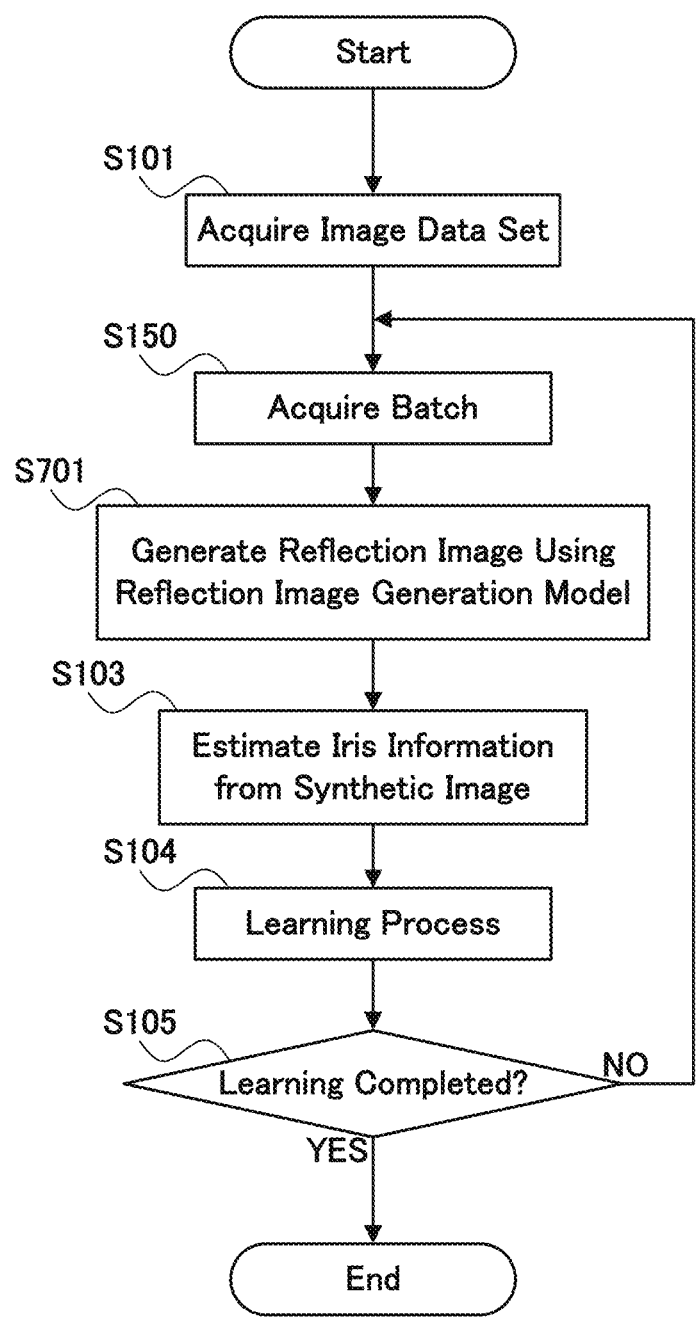
FIG. 25 is a flowchart showing a flow of operations of the learning system according to the seventh example embodiment.

As shown in FIG. 25, when the learning system 10 of the seventh example embodiment operates, first, the synthetic image generation unit 110 acquires an image data set of the original images (Step S101). Then, the synthetic image generation unit 110 acquires the training data each piece thereof consisting of a pair of the correct answer and the original image from the acquired image data set, the number of pieces of the training data according with a predetermined batch size (Step S150).

Then, the reflection image generation model 150 which has been learned by CycleGAN, generates a reflection image using the original image and a random number as input (Step S701). The reflection image generation model 150 outputs the generated reflection image to the iris information estimation unit 120.

Subsequently, the iris information estimation unit 120 estimates the information on the iris based on the reflection image generated by the reflection image generation model 150 (Step S103). Based on the estimated information on the iris estimated by the iris information estimation unit 120 and the correct answer information in the original image, the learning unit 130 performs the learning process for the iris information estimation unit 120 (Step S104).

Subsequently, the learning unit 130 determines whether all learning has been completed or not (Step S105). If it is determined that the learning has been completed (Step S105: YES), the sequence of processes ends. On the other hand, if it is determined that the learning has not yet been completed (Step S105: NO), the processing may be started again from Step S150. As already explained, in Step S701, since a random number is input in addition to the original image, with respect to the reflection image generated in each round of the loop, all of them are different from each other.

(Technical Effects)

Next, the technical effects obtained by the learning system 10 of the seventh example embodiment will be described.

As explained in FIGS. 23 through 25, in the learning system 10 of the seventh example embodiment, the reflection image for learning is generated by the reflection image generation model 150 that has been learned by CycleGAN. Thereby, the reflection image can be easily generated using only the original image. In other words, the reflection image for learning can be generated without acquiring the reflection component.

Eighth Example Embodiment

The estimation system 20 according to an eighth example embodiment will be explained with reference to FIG. 26 and FIG. 27. The estimation system 20 according to the eighth example embodiment is a system comprises the iris information estimation unit 120 learned in the learning system 10 according to the first through seventh example embodiments described above. The hardware configuration thereof may be the same as that of the learning system 10 according to the first example embodiment (see FIG. 1), and the other parts of the system may also be the same as those of the learning system 10 according to the first through seventh example embodiments. For this reason, in the following, the parts that overlap with the example embodiments already described will be omitted as appropriate.

(Functional Configuration)

First, a functional configuration of the estimation system 20 according to the eighth example embodiment will be described with reference to FIG. 26. FIG. 26 is a block diagram showing the functional configuration of the estimation system according to the eighth example embodiment. In FIG. 26, the reference signs same as in FIG. 2 are assigned to the elements similar to in FIG. 2 respectively.

Figure 26:
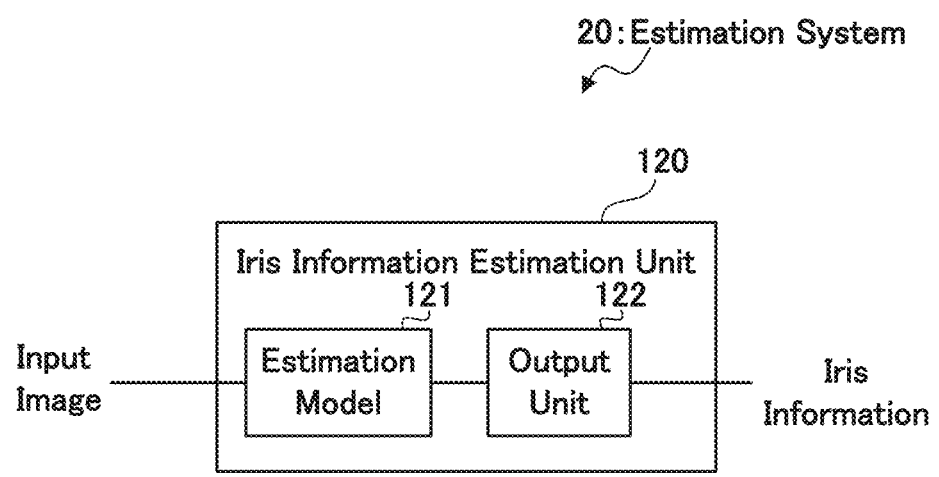
FIG. 26 is a block diagram showing a functional configuration of the estimation system according to the eighth example embodiment.

As shown in FIG. 26, the estimation system 20 according to the eighth example embodiment comprises an iris information estimation unit 120 as a processing block for realizing the functions of the estimation system 20. In particular, the iris information estimation unit 120 according to the eighth example embodiment comprises an estimation model 121 and an output unit 122.

The estimation model 121 is a model for estimating information on a specific portion (here, the iris) of a living body from the original image. The estimation model 121 is designed by a neural network, for example, and has been learned by the learning system 10 according to the first through seventh example embodiments described above. That is, the estimation model 121 is a model whose parameters have been optimized by using as the training data an image where the reflection component is reflected on the original image.

The output unit 122 may be configured to output the information on the specific portion of the living body estimated by the estimation model 121 to the outside of the system. The output unit 122 may be configured to output the information on the specific portion of the living body to a biometric authentication system. For example, the output unit 122 may be configured to output information on the feature amount of the iris to an iris authentication system. Such an output destination is only an example, and the output unit 122 may be configured to output the information on the specific portion of the living body to various other devices and systems.

(Operation Flow)

Next, with reference to FIG. 27, a flow of operations of the estimation system 20 according to the eighth example embodiment will be described. FIG. 27 is a flowchart showing the flow of operations of the estimation system according to the eighth example embodiment.

Figure 27:
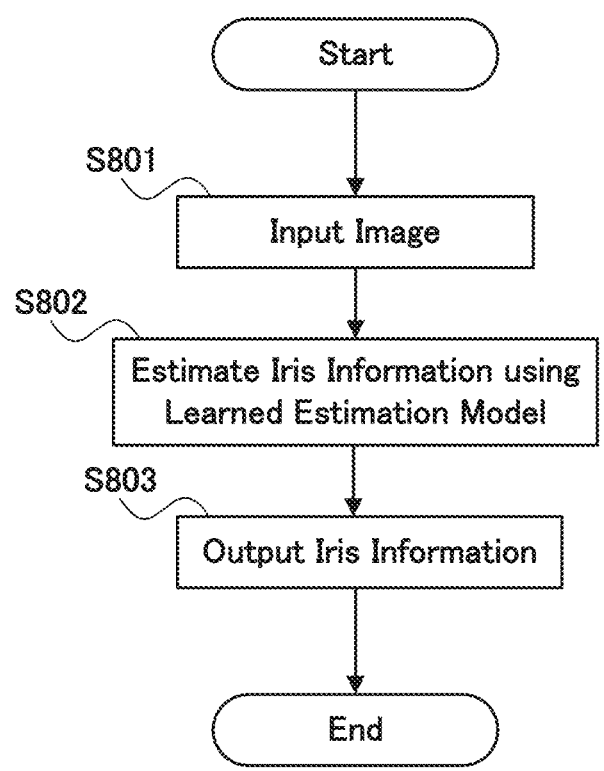
FIG. 27 is a flowchart showing a flow of operations of the estimation system according to the eighth example embodiment.

As shown in FIG. 27, when the estimation system 20 according to the eighth example embodiment is operated, first, an input image including the living body is inputted to the iris information estimation unit 120 (Step S801). To the iris information estimation unit 120, an image taken with a camera, for example, may be directly inputted as it is, or an image stored in a storage or the like may be inputted.

Subsequently, the estimation model 121 estimates the information on the iris of the living body from the input image (Step S802). Then, the output unit 122 outputs the information on the iris of the living body estimated by the estimation model 121 (Step S803).

The sequence of processes described above may be repeated as long as the input image continues to be input. However, when it can be determined that there is no longer a need to estimate the information on the iris, the sequence of processes may be stopped even if the input image continues to be input. For example, when the information on the iris has been output to the iris authentication system, the sequence of processes may be terminated at the moment when the authentication result by the iris authentication system has been obtained.

(Technical Effects)

Next, the technical effects obtained by the estimation system 20 according to the eighth example embodiment will be explained.

As explained in FIGS. 26 and 27, in the estimation system 20 according to the eighth example embodiment, the information on the iris is estimated using the iris information estimation unit 120 (more specifically, the estimation model 121) learned by the learning system 10 according to the first through seventh example embodiments. As already explained, the learning for the iris information estimation unit 120 is performed using an image where the reflection component is reflected on the original image. Thereby, even when the input image contains the reflection component (e.g., even when the reflection component caused by eye glasses, which the living body wears, overlaps the iris), it is possible to accurately estimate the information on the specific portion of the living body.

Also included in the scope of each example embodiment is a processing method comprising the steps of: recording in a recording medium, a computer program to operate the configuration of each above-mentioned example embodiment so as to realize the functions of each example embodiment; reading out the computer program recorded in the recording medium as code; and executing the computer program in a computer. In other words, a computer-readable recording medium is also included in the scope of each example embodiment. In addition, not only the recording medium where the above-mentioned computer program is recorded but also the computer program itself is included in each embodiment.

For example, a floppy disk (registered trademark), a hard disk, an optical disk, an optical magnetic disk, a CD-ROM, a magnetic tape, a non-volatile memory cards and a ROM can be each used as the recording medium. In addition, not only the computer program recorded on the recording medium that executes processing by itself, but also the computer program that operates on an OS to execute processing in cooperation with other software and/or expansion board functions is included in the scope of each embodiment.

This disclosure can be modified as necessary to the extent that does not contradict the concept or idea of the invention which can be read from the entire claims and the entire specification; and the learning system, the estimation system, the estimation method, and the computer program with such modifications are also included in the technical concept of this disclosure.

<Supplementary Note>

With respect to the example embodiments described above, they may be further described as in supplementary notes below, but are not limited to the following.

(Supplementary Note 1)

A learning system described as the Supplementary Note 1 is a learning system comprising: a generation unit configured to synthesize with an original image including a living body, information on a reflection component of light not derived from the original image to generate a synthetic image; and a learning unit configured to perform learning for an estimation model based on information on a specific portion of the living body estimated from the synthetic image by the estimation model and correct answer information indicating a correct answer of the information on the specific portion in the original image.

(Supplementary Note 2)

A learning system described as the Supplementary Note 2 is the learning system according to the Supplementary Note 1 that further comprises an extraction unit configured to extract information on the reflection component from a reflection image having the reflection component.

(Supplementary Note 3)

A learning system described as the Supplementary Note 3 is the learning system according to the Supplementary Note 2, wherein the extraction unit is configured to extract an area where a pixel value in the reflection image is equal to a predetermined threshold value or higher, as the information on the reflection component.

(Supplementary Note 4)

A learning system described as the Supplementary Note 4 is the learning system according to any one of the Supplementary Notes 1 to 3, wherein the generation unit is configured to generate more than one synthetic image from a single original image, by performing at least one of processes on the information on the reflection component, the processes including: movement; rotation; enlargement; and reduction, and then synthesizing the information on the reflection component.

(Supplementary Note 5)

A learning system described as the Supplementary Note 5 is the learning system according to any one of the Supplementary Notes 1 to 4, wherein the generation unit is configured to synthesize the information on the reflection component so that the information on the reflection component overlaps at least partially the specific portion.

(Supplementary Note 6)

A learning system described as the Supplementary Note 6 is the learning system according to any one of the Supplementary Notes 1 to 5, wherein the generation unit is configured to generate a figure corresponding to the information on the reflection component and clip the figure from the original image to generate the synthetic image.

(Supplementary Note 7)

A learning system described as the Supplementary Note 7 is the learning system according to any one of the Supplementary Notes 1 to 5, wherein the generation unit is configured to generate the synthetic image from the original image using a model learned by a neural network.

(Supplementary Note 8)

An estimation system described as the Supplementary Note 8 is an estimation system comprising an estimation model and an output unit, wherein the estimation model is configured to be learned using: a generation unit configured to synthesize with an original image including a living body, information on a reflection component of light not derived from the original image to generate a synthetic image; and a learning unit configured to perform learning for the estimation model based on information on a specific portion of the living body estimated from the synthetic image by the estimation model and correct answer information indicating a correct answer of the information on the specific portion in the original image, and the output unit is configured to estimate and output information on the specific portion in an input image using the estimation model.

(Supplementary Note 9)

A learning method described as the Supplementary Note 9 is a learning method including the steps of: synthesizing with an original image including a living body, information on a reflection component of light not derived from the original image to generate a synthetic image; and performing learning for an estimation model based on information on a specific portion of the living body estimated from the synthetic image by the estimation model and correct answer information indicating a correct answer of the information on the specific portion in the original image.

(Supplementary Note 10)

A computer program described as the Supplementary Note 10 is a computer program that allows a computer to synthesize with an original image including a living body, information on a reflection component of light not derived from the original image to generate a synthetic image; and perform learning for an estimation model based on information on a specific portion of the living body estimated from the synthetic image by the estimation model and correct answer information indicating a correct answer of the information on the specific portion in the original image.

(Supplementary Note 11)

The recording medium described as supplementary note 11 is a recording medium recording the computer program described as the supplementary note 10.

DESCRIPTION OF REFERENCE SIGNS

- 10 Learning System
- 20 Estimation system
- 110 Synthetic image generation unit
- 111 Perturbation process unit
- 112 Overlap determination unit
- 113 Area count determination unit
- 114 Area Coordinate determination unit
- 115 Area size determination unit
- 116 Area clipping unit
- 120 Iris information estimation unit
- 121 Estimation model
- 122 Output unit
- 130 Learning unit
- 131 Loss function calculation unit
- 132 Gradient calculation unit
- 133 Parameter update unit
- 140 Reflection component extraction unit
- 141 Pixel value determination unit
- 150 Reflection image generation model
- 160 Reflection Image discrimination model
- 170 Non-reflection image generation model
- 180 Non-reflection image discrimination model

The invention claimed is:

1. A learning system comprising:
at least one memory storing instructions; and
at least one processor configured to execute the instructions to:

generate a synthetic image by synthesizing an original image with information on a reflection component of light, the original image including an iris of a living body, the information on the reflection component of light not derived from the original image and synthesized so that a distance from the iris of the living body is within a predetermined range, wherein correct answer information is paired with the original image as training data;

estimate, using an estimation model, the information on the iris of the living body based on the synthetic image; and perform learning for the estimation model based on information on the iris of the living body and the correct answer information indicating the correct answer of the information on the iris of the living body in the original image.

2. The learning system according to claim 1, wherein the at least one processor is further configured to execute the instructions to extract information on the reflection component from a reflection image having the reflection component.

3. The learning system according to claim 2, wherein the at least one processor is configured to execute the instructions to extract an area where a pixel value in the reflection image is equal to a predetermined threshold value or higher, as the information on the reflection component.

4. The learning system according to claim 1, wherein the at least one processor is configured to execute the instructions to generate more than one synthetic image from a single original image, by performing at least one of processes on the information on the reflection component, the processes including: movement; rotation; enlargement; and reduction, and then synthesizing the information on the reflection component.

5. The learning system according to claim 1, wherein the at least one processor is configured to execute the instructions to synthesize the information on the reflection component so that the information on the reflection component overlaps at least partially the specific portion.

6. The learning system according to claim 1, wherein the at least one processor is configured to execute the instructions to generate a figure corresponding to the information on the reflection component and clip the figure from the original image to generate the synthetic image.

7. The learning system according to claim 1, wherein the at least one processor is configured to execute the instructions to generate the synthetic image from the original image using a model learned by a neural network.

8. A learning method performed by a computer and comprising:

generating a synthetic image by synthesizing an original image with information on a reflection component of light, the original image including an iris of a living body, the information on the reflection component of light not derived from the original image and synthesized so that a distance from the iris of the living body is within a predetermined range, wherein correct answer information is paired with the original image as training data;

estimating, using an estimation model, the information on the iris of the living body based on the synthetic image; and performing learning for the estimation model based on information on the iris of the living body and the correct answer information indicating the correct answer of the information on the iris of the living body in the original image.

9. A non-transitory recording medium storing a computer program executable by a computer to:
generate a synthetic image by synthesizing an original image with information on a reflection component of light, the original image including an iris of a living body, the information on the reflection component of light not derived from the original image and synthesized so that a distance from the iris of the living body is within a predetermined range, wherein correct answer information is paired with the original image as training data;
estimate, using an estimation model, the information on the iris of the living body based on the synthetic image; and
perform learning for the estimation model based on information on the iris of the living body and the correct answer information indicating the correct answer of the information on the iris of the living body in the original image.

* * * * *